US009498751B2

(12) United States Patent
Yin et al.

(10) Patent No.: US 9,498,751 B2
(45) Date of Patent: Nov. 22, 2016

(54) COATED SUBSTRATES FOR USE IN CATALYSIS AND CATALYTIC CONVERTERS AND METHODS OF COATING SUBSTRATES WITH WASHCOAT COMPOSITIONS

(71) Applicant: SDCmaterials, Inc., Tempe, AZ (US)

(72) Inventors: Qinghua Yin, Tempe, AZ (US);
Xiwang Qi, Scottsdale, AZ (US);
Maximilian A. Biberger, Scottsdale, AZ (US); Jayashir Sarkar, Tempe, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 63 days.

(21) Appl. No.: 14/599,316

(22) Filed: Jan. 16, 2015

(65) Prior Publication Data

US 2015/0217229 A1 Aug. 6, 2015

Related U.S. Application Data

(63) Continuation of application No. 14/165,457, filed on Jan. 27, 2014, now Pat. No. 8,969,237, which is a continuation of application No. 13/589,024, filed on Aug. 17, 2012, now Pat. No. 8,679,433.

(60) Provisional application No. 61/525,661, filed on Aug. 19, 2011, provisional application No. 61/652,098, filed on May 25, 2012.

(51) Int. Cl.
| | |
|---|---|
| *B01D 53/94* | (2006.01) |
| *B01J 23/40* | (2006.01) |
| *B01J 29/00* | (2006.01) |
| *B01J 32/00* | (2006.01) |
| *B01J 35/00* | (2006.01) |
| *B01J 37/00* | (2006.01) |
| *F01N 3/10* | (2006.01) |
| *B01J 29/04* | (2006.01) |
| *B01J 37/02* | (2006.01) |
| *B01J 37/34* | (2006.01) |
| *B01J 21/04* | (2006.01) |
| *B01J 23/44* | (2006.01) |
| *B01J 23/63* | (2006.01) |
| *B01J 29/06* | (2006.01) |
| *B01J 29/068* | (2006.01) |
| *B01J 35/02* | (2006.01) |
| *B01J 35/04* | (2006.01) |
| *B01J 37/16* | (2006.01) |

(52) U.S. Cl.
CPC .......... *B01D 53/944* (2013.01); *B01D 53/945* (2013.01); *B01J 21/04* (2013.01); *B01J 23/44* (2013.01); *B01J 23/63* (2013.01); *B01J 29/04* (2013.01); *B01J 29/06* (2013.01); *B01J 29/068* (2013.01); *B01J 35/0006* (2013.01); *B01J 35/0013* (2013.01); *B01J 35/0066* (2013.01); *B01J 35/023* (2013.01); *B01J 35/04* (2013.01); *B01J 37/0018* (2013.01); *B01J 37/0213* (2013.01); *B01J 37/0244* (2013.01); *B01J 37/0246* (2013.01); *B01J 37/349* (2013.01); *B01D 2255/1021* (2013.01); *B01D 2255/1023* (2013.01); *B01D 2255/2092* (2013.01); *B01D 2255/30* (2013.01); *B01D 2255/50* (2013.01); *B01D 2255/9022* (2013.01); *B01D 2255/912* (2013.01); *B01D 2255/9155* (2013.01); *B01D 2255/9202* (2013.01); *B01D 2258/012* (2013.01); *B01J 37/16* (2013.01); *B01J 2229/42* (2013.01)

(58) Field of Classification Search
CPC .......... B01J 23/40; B01J 29/00; B01J 32/00; B01J 35/023; B01J 37/00; F01N 3/10; B01D 53/94
USPC .................................................... 502/527.12
See application file for complete search history.

(56) References Cited

U.S. PATENT DOCUMENTS

| 2,021,936 A | 11/1935 | Johnstone |
| 2,284,554 A | 5/1942 | Beyerstedt |

(Continued)

FOREIGN PATENT DOCUMENTS

| CN | 1647858 A | 8/2005 |
| CN | 101011664 A | 8/2007 |

(Continued)

OTHER PUBLICATIONS

Ahmad, K. et al. (2008). "Hybrid Nanocomposites: A New Route Towards Tougher Alumina Ceramics," *Composites Science and Technology* 68: 1321-1327.
Babin, A. et al. (1985). "Solvents Used in the Arts," *Center for Safety in the Arts*: 16 pages.
Bateman, J. E. et al. (Dec. 17, 1998). "Alkylation of Porous Silicon by Direct Reaction with Alkenes and Alkynes," *Angew. Chem Int. Ed.* 37(19):2683-2685.

(Continued)

*Primary Examiner* — Timothy Vanoy
(74) *Attorney, Agent, or Firm* — Morrison & Foerster LLP

(57) ABSTRACT

Disclosed are, inter alia, methods of forming coated substrates for use in catalytic converters, as well as washcoat compositions and methods suitable for using in preparation of the coated substrates, and the coated substrates formed thereby. The catalytic material is prepared by a plasma-based method, yielding catalytic material with a lower tendency to migrate on support at high temperatures, and thus less prone to catalyst aging after prolonged use. Also disclosed are catalytic converters using the coated substrates, which have favorable properties as compared to catalytic converters using catalysts deposited on substrates using solution chemistry. Also disclosed are exhaust treatment systems, and vehicles, such as diesel vehicles, particularly light-duty diesel vehicles, using catalytic converters and exhaust treatment systems using the coated substrates.

61 Claims, 11 Drawing Sheets

(56) References Cited

U.S. PATENT DOCUMENTS

| | | |
|---|---|---|
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Miyajima |
| 3,520,656 A | 7/1970 | Yates et al. |
| 3,537,513 A | 11/1970 | Austin |
| 3,552,653 A | 1/1971 | Inoue |
| 3,617,358 A | 11/1971 | Dittrich |
| 3,667,111 A | 6/1972 | Chartet |
| 3,730,827 A | 5/1973 | Matchen et al. |
| 3,741,001 A | 6/1973 | Fletcher et al. |
| 3,752,172 A | 8/1973 | Cohen et al. |
| 3,761,360 A | 9/1973 | Auvil et al. |
| 3,774,442 A | 11/1973 | Gustaysson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,877,937 A | 10/1989 | Müller |
| 4,885,038 A | 12/1989 | Anderson et al. |
| 4,921,586 A | 5/1990 | Molter |
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,656 A | 7/1993 | Frind |
| 5,230,844 A | 7/1993 | Macaire et al. |
| 5,233,153 A | 8/1993 | Coats |
| 5,269,848 A | 12/1993 | Nakagawa |
| 5,294,242 A | 3/1994 | Zurecki et al. |
| 5,330,945 A | 7/1994 | Beckmeyer et al. |
| 5,338,716 A | 8/1994 | Triplett et al. |
| 5,357,075 A | 10/1994 | Muehlberger |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,436,080 A | 7/1995 | Inoue et al. |
| 5,439,865 A | 8/1995 | Abe et al. |
| 5,442,153 A | 8/1995 | Marantz et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |

(56) References Cited

U.S. PATENT DOCUMENTS

| | | |
|---|---|---|
| 5,993,967 A | 11/1999 | Brotzman, Jr. et al. |
| 5,993,988 A | 11/1999 | Ohara et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 * | 12/2002 | He .................... B01J 23/56 427/419.2 |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zomes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKechnie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |

(56) References Cited

U.S. PATENT DOCUMENTS

| | | |
|---|---|---|
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,902,104 B2 | 3/2011 | Kalck |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | van den Hoek et al. |
| 8,679,433 B2 | 3/2014 | Yin et al. |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,932,514 B1 | 1/2015 | Yin et al. |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1* | 7/2003 | Cai ............... B01D 53/94 502/303 |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |

(56) References Cited

U.S. PATENT DOCUMENTS

| | | |
|---|---|---|
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1 | 11/2007 | Kear et al. |
| 2007/0266825 A1 | 11/2007 | Ripley et al. |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0108005 A1 | 5/2008 | Carpenter |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0092358 A1 | 4/2010 | Koegel et al. |
| 2010/0124514 A1* | 5/2010 | Chelluri ............ B22F 1/0014 419/13 |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1* | 12/2013 | Barcikowski ........ C08K 3/0008 502/5 |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0141236 A1 | 5/2015 | Yin et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0266002 A1 | 9/2015 | Biberger et al. |
| 2015/0314260 A1 | 11/2015 | Biberger |
| 2015/0314581 A1 | 11/2015 | Biberger |

FOREIGN PATENT DOCUMENTS

| | | |
|---|---|---|
| CN | 101301610 A | 11/2008 |
| DE | 34 45 273 A1 | 6/1986 |
| EP | 0 347 386 A1 | 12/1989 |

(56) References Cited

FOREIGN PATENT DOCUMENTS

| | | |
|---|---|---|
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A * | 5/1995 ............... F28D 7/02 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/16882 | 3/2000 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/134051 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |

OTHER PUBLICATIONS

Büchel, R. et al. (2009). "Influence of Pt Location on $BaCO_3$ or $Al_2O_3$ During $NO_x$ Storage Reduction," *Journal of Catalysis* 261: 201-207.

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline $Y_2O_3$ Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional $Fe_3O_{4/TiO2}$ Core/Shell Magnetic Nanoparticles as Photokilling Agents for Pathogenic Bacteria," *Small* 4(4): 485-491.

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Faber, K. T. et al. (Sep. 1988). "Toughening by Stress-Induced Microcracking in Two-Phase Ceramics," Journal of the American Ceramic Society 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," Revue Générale De L'Electricite, RGE, Paris, France, No. 2, pp. 7-12 (in French).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles," *Chemical Physics Letters* 221 :363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:p. 9.1.1-p. 9.1.6.

(56) References Cited

OTHER PUBLICATIONS

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu—Bi Alloys Prepared by Co-Evaporation in a Continuous Gas Flow," *NanoStructured Materials* 7(6):605-610.

Kim, N. Y. et al. (Mar. 5, 1997). "Thermal Derivatization of Porous Silicon with Alcohols," *J. Am. Chem. Soc.* 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt—Rh Catalysts: I. Microstructural Characterization," *Journal of Catalysis* 154: 261-275.

Lamouroux, E. et al. (2007). "Identification of Key Parameters for the Selective Growth of Single or Double Wall Carbon Nanotubes on $FeMo/Al_2O_3$ CVD Catalysts," *Applied Catalysts A: General* 323: 162-173.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by HF—$HNO_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Luo, J. et al. (2008). "Core/Shell Nanoparticles as Electrocatalysts for Fuel Cell Reactions," *Advanced Materials* 20: 4342-4347.

Martinez-Hansen, V. et al. (2009). "Development of Aligned Carbon Nanotubes Layers Over Stainless Steel Mesh Monoliths," *Catalysis Today* 1475: 571-575.

Mignard, D. et al. (2003). "Methanol Synthesis from Flue-Gas $CO_2$ and Renewable Electricity: A Feasibility Study," *International Journal of Hydrogen Energy* 28: 455-464.

Mühlenweg, H. et al. (2004). "Gas-Phase Reactions—Open Up New Roads to Nanoproducts," *Degussa ScienceNewsletter* No. 08, pp. 12-16.

Nagai, Y. et al. (Jul. 3, 2006). "Sintering Inhibition Mechanism of Platinum Supported on Ceria-Based Oxide and Pt—Oxide-Support Interaction," *J. Catalysis* 242:103-109.

Nasa (2009). "Enthalpy," Article located at http://www.grc.nasa.gov/WWW/K-12/airplane/enthalpy.htrnl, published by National Aeronautics and Space Administration on Nov. 23, 2009, 1 page.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.

Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.

"Plasma Spray and Wire Flame Spray Product Group," located at http://www.processmaterials.com/spray.html, published by Process Materials, Inc., last accessed Aug. 5, 2013, 2 pages.

"Platinum Group Metals: Annual Review 1996" (Oct. 1997). Engineering and Mining Journal, p. 63.

Rahaman, R. A. et al. (1995). "Synthesis of Powders," in *Ceramic Processing and Sintering*. Marcel Decker, Inc., New York, pp. 71-77.

Sailor, M. J. (1997). "Surface Chemistry of Luminescent Silicon Nanocrystallites," *Adv. Mater.* 9(10):783-793.

Schimpf, S. et al. (2002). "Supported Gold Nanoparticles: In-Depth Catalyst Characterization and Application in Hydrogenation and Oxidation Reactions," *Catalysis Today* 2592: 1-16.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Strobel, R. et al. (2003). "Flame-made Platinum/Alumina: Structural Properties and Catalytic Behaviour in Enantioselective Hydrogenation," *Journal of Catalysis* 213: 296-304.

Subramanian, S. et al. (1991). "Structure and Activity of Composite Oxide Supported Platinum—Iridium Catalysts," *Applied Catalysts* 74: 65-81.

Tao, Y.-T. (May 1993). "Structural Comparison of Self-Assembled Monolayers of *n*-Alkanoic Acids on the surfaces of Silver, Copper, and Aluminum," *J. Am. Chem. Soc.* 115(10):4350-4358.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.

Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.

Vardelle, M. et al. (Jun. 1991). "Experimental Investigation of Powder Vaporization in Thermal Plasma Jets," *Plasma Chemistry and Plasma Processing* 11(2):185-201.

Viswanathan, V. et al. (2006). "Challenges and Advances in Nanocomposite Processing Techniques," *Materials Science and Engineering* R 54: 121-285.

Wan, J. et al. (2005). "Spark Plasma Sintering of Silicon Nitride/ Silicon Carbide Nanocomposites with Reduced Additive Amounts," *Scripta Materialia* 53: 663-667.

Yoshida, T. (1994). "The Future of Thermal Plasma Processing for Coating", *Pure & Appl. Chem.* 66(6):1223-1230.

Zou, J. et al. (Jun. 4, 2004). "Solution Synthesis of Ultrastable Luminescent Siloxane-Coated Silicon Nanoparticles," *Nano Letters* 4(7):1181-1186.

International Search Report mailed Oct. 26, 2012, for PCT Patent Application No. PCT/US2012/051488, filed Aug. 17, 2012, published on Feb. 28, 2013, as WO-2013/028575; 3 pages.

Written Opinion mailed on Oct. 26, 2012, for PCT Patent Application No. PCT/US2012/051488, filed Aug. 17, 2012, published on Feb. 28, 2013, as WO-2013/028575; 6 pages.

International Preliminary Report on Patentability dated Feb. 25, 2014, for PCT Patent Application No. PCT/US2012/051488, filed Aug. 17, 2012, published on Feb. 28, 2013, as WO-2013/028575; 7 pages.

U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.

(56) References Cited

OTHER PUBLICATIONS

U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
Birlik, I. et al. (Jun. 15, 2010). "Nanoparticle Doped YBCO Films Prepared by Chemical Solution Deposition Method," *6th Nanoscience and Nanotechnology Conference*, Izmir, Turkey: 1 page.
Cospheric LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.
Jensen, J. et al. (2000). "Preparation of $ZnO$—$Al_2O_3$ Particles in a Premixed Flame," *Journal of Nanoparticle Research* 2: 363-373.

* cited by examiner

COATED SUBSTRATES FOR USE IN CATALYSIS AND CATALYTIC CONVERTERS AND METHODS OF COATING SUBSTRATES WITH WASHCOAT COMPOSITIONS

CROSS-REFERENCE TO RELATED APPLICATIONS

This patent application is a continuation of pending U.S. patent application Ser. No. 14/165,457 filed Jan. 27, 2014, which is a continuation of U.S. patent application Ser. No. 13/589,024 filed Aug. 17, 2012, now U.S. Pat. No. 8,679, 433 issued on Mar. 25, 2014, which claims priority benefit of U.S. Provisional Patent Application No. 61/525,661 filed Aug. 19, 2011, and of U.S. Provisional Patent Application No. 61/652,098 filed May 25, 2012. The entire contents of those patent applications are hereby incorporated by reference herein.

FIELD OF THE INVENTION

The present invention relates to the field of catalysts. More specifically, the present invention relates to nanoparticle catalysts, catalytic converter washcoats, and catalytic converters formed from such washcoats.

BACKGROUND OF THE INVENTION

A significant portion of pollutant gases emitted by internal combustion engines are produced when the engine is initially started ("cold-start"), but before the catalytic converter in the emissions system has warmed up to its operating temperature. In order to reduce harmful emissions during the cold-start phase, such as that of a light-duty diesel vehicle (for example, an automobile or light truck), washcoats that contain zeolites can be used to coat the substrate used in the catalytic converter of the vehicle. These zeolites act as a temporary storage area for the pollutants carbon monoxide (CO), hydrocarbons (HC), and nitrogen oxides ($NO_x$) during the cold-start period, when the catalytic converter is still cold. After the catalytic converter heats up to its operating temperature, known as the light-off temperature, the stored gases are released and subsequently decomposed by the catalytically active material on the substrate.

A high light-off temperature is undesirable, as many vehicular trips are of short duration, and during the time required for the catalytic converter to reach its operating temperature (that is, the light-off temperature), pollutants must either be released untreated to the environment, or stored in the exhaust system until the light-off temperature is reached. Even if pollutants are trapped effectively prior to light-off, the catalytic converter may not reach operating temperature if multiple successive short trips are made, and the zeolites used for storage may become saturated, again resulting in release of pollutants to the environment.

Commercially available catalytic converters use platinum group metal (PGM) catalysts deposited on substrates by wet chemistry methods, such as precipitation of platinum ions and/or palladium ions from solution onto a substrate. These PGM catalysts are a considerable portion of the cost of catalytic converters. Accordingly, any reduction in the amount of PGM catalysts used to produce a catalytic converter is desirable. Commercially available catalytic converters also display a phenomenon known as "aging," in which they become less effective over time; the light-off temperature starts to rise as the catalytic converter ages, and emission levels also start to rise. Accordingly, reduction of the aging effect is also desirable, in order to prolong the efficacy of the catalytic converter for controlling emissions.

SUMMARY OF THE INVENTION

The disclosed catalysts and washcoats may provide, among other advantages, catalytic converters with significantly reduced light-off temperatures, especially in comparison to aged commercially available catalysts prepared by wet-chemistry methods, while using the same amount or less of platinum group metal. Alternatively, the described catalysts and washcoats may reduce the amount of platinum group metal used to attain the same light-off temperature as aged commercially available catalysts prepared by wet-chemistry methods. Thus, improved performance of the emission control system (that is, reduced emissions of one or more regulated pollutant), and/or reduced cost of the emission control system may be attained, as compared to catalytic converters prepared using previous wet-chemistry methods.

As described herein, catalytic converters having a reduced light-off temperature and/or reduced platinum group metal loading requirements may be produced by utilizing catalytically active powder, and by separating the catalytically active powder from the high concentration of zeolites, wherein the high concentration of zeolites is in a different coating layer than the catalytically active powder. One embodiment, for example, is a multi-layer washcoat wherein the high concentration of zeolites is used in a first coating layer, while the catalytically active powder is used in a second coating layer. Optionally, a corner-fill washcoat is applied to the substrate prior to application of subsequent washcoats.

In some embodiments, the invention comprises a coated substrate comprising a substrate; a washcoat layer comprising zeolite particles; and a washcoat layer comprising catalytically active particles; wherein the catalytically active particles comprise composite nano-particles bonded to micron-sized carrier particles, and the composite nano-particles comprise a support nano-particle and a catalytic nano-particle. In another embodiment of the coated substrate, the washcoat layer comprising zeolite particles is formed on top of the washcoat layer comprising catalytically active particles. In another embodiment of the coated substrate, the washcoat layer comprising catalytically active particles is formed on top of the washcoat layer comprising zeolite particles. In any of the foregoing embodiments of the coated substrate, the catalytic nano-particles comprise at least one platinum group metal. In any of the foregoing embodiments of the coated substrate, the catalytic nano-particles can comprise platinum and palladium, such as platinum and palladium in a weight ratio of 2:1 platinum: palladium. In any of the foregoing embodiments of the coated substrate, the support nano-particles can have an average diameter of 10 nm to 20 nm. In any of the foregoing embodiments of the coated substrate, the catalytic nano-particles can have an average diameter of between 1 nm and 5 nm.

In any of the foregoing embodiments of the coated substrate, the washcoat layer can comprise zeolite particles comprises metal-oxide particles and boehmite particles. In any of the foregoing embodiments of the coated substrate, the metal-oxide particles can be aluminum-oxide particles. In any of the foregoing embodiments of the coated substrate, the zeolite particles can comprise 60% to 80% by weight of the mixture of zeolite particles, metal-oxide particles, and boehmite particles in the washcoat layer comprising zeolite particles. In any of the foregoing embodiments of the coated substrate, the boehmite particles can comprise 2% to 5% by weight of the mixture of zeolite particles, metal-oxide particles, and boehmite particles in the washcoat layer comprising zeolite particles. In any of the foregoing embodiments of the coated substrate, the metal-oxide particles can comprise 15% to 38% by weight of the mixture of zeolite particles, metal-oxide particles, and boehmite particles in the washcoat layer comprising zeolite particles. In any of the foregoing embodiments of the coated substrate, the washcoat layer comprising zeolite particles does not include or is substantially free of platinum group metals. In any of the foregoing embodiments of the coated substrate, the zeolite particles in the washcoat layer can have a diameter of 0.2 microns to 8 microns. In any of the foregoing embodiments of the coated substrate, the washcoat layer comprising catalytically active particles can further comprise boehmite particles and silica particles.

In any of the foregoing embodiments of the coated substrate, the washcoat layer comprising catalytically active particles can be substantially free of zeolites. In any of the foregoing embodiments of the coated substrate, the catalytically active particles can comprise 35% to 95% by weight of the combination of the catalytically active particles, boehmite particles, and silica particles in the washcoat layer comprising catalytically active particles. In any of the foregoing embodiments of the coated substrate, the silica particles can be present in an amount up to 20% by weight of the combination of the catalytically active particles, boehmite particles, and silica particles in the washcoat layer comprising catalytically active particles. In any of the foregoing embodiments of the coated substrate, the boehmite particles comprise 2% to 5% by weight of the combination of the catalytically active particles, the boehmite particles, and the silica particles in the washcoat layer comprising catalytically active particles. In one embodiment of the coated substrate, the washcoat layer comprising catalytically active particles comprises 92% by weight of the catalytically active particles, 3% by weight of the boehmite particles, and 5% by weight of the silica particles.

In any of the foregoing embodiments of the coated substrate, the substrate comprises cordierite. The substrate can comprise a honeycomb structure. In any of the foregoing embodiments of the coated substrate, the washcoat layer comprising zeolite particles can have a thickness of 25 g/l to 90 g/l. In any of the foregoing embodiments of the coated substrate, the washcoat layer comprising catalytically active particles can have a thickness of 50 g/l to 250 g/l. Any of the foregoing embodiments of the coated substrate can further comprise a corner-fill layer deposited directly on the substrate.

In any of the foregoing embodiments of the coated substrate, the coated substrate can have a platinum group metal loading of 4 g/l or less and a light-off temperature for carbon monoxide at least 5° C. lower than the light-off temperature of a substrate with the same platinum group metal loading deposited by wet-chemistry methods. In any of the foregoing embodiments of the coated substrate, the coated substrate has a platinum group metal loading of about 3.0 g/l to about 4.0 g/l.

In any of the foregoing embodiments of the coated substrate, the coated substrate can have a platinum group metal loading of about 3.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter. In any of the foregoing embodiments of the coated substrate, the coated substrate can have a platinum group metal loading of about 3.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

In some embodiments, the invention comprises a catalytic converter comprising a coated substrate according to any of the foregoing embodiments. In further embodiments, the invention comprises an exhaust treatment system comprising a conduit for exhaust gas and a catalytic converter comprising a coated substrate according to any of the foregoing embodiments. In further embodiments, the invention comprises a diesel vehicle comprising a catalytic converter comprising a coated substrate according to any of the foregoing embodiments. The diesel vehicle can be a light-duty diesel vehicle.

In some embodiments, the invention comprises a method of treating an exhaust gas, where the method comprises contacting the coated substrate of any of the foregoing embodiments with the exhaust gas. The substrate can be housed within a catalytic converter configured to receive the exhaust gas.

In some embodiments, the invention comprises a method of forming a coated substrate, the method comprising a) coating a substrate with a washcoat composition comprising zeolite particles; and b) coating the substrate with a washcoat composition comprising catalytically active particles; the catalytically active particles comprises composite nano-particles which are bonded to micron-sized carrier particles, said composite nano-particles comprising a support nano-particle and a catalytic nano-particle. The step of coating the substrate with the washcoat layer comprising zeolite particles can be performed before coating the substrate with the washcoat layer comprising catalytically active particles, or the step of coating the substrate with the washcoat layer comprising catalytically active particles can be performed before coating the substrate with the washcoat layer comprising zeolite particles. Any of the foregoing methods can additionally comprise the step of coating the substrate with a corner-fill washcoat prior to both step a) and step b). In some embodiments of any of the foregoing methods, the washcoat composition comprising zeolite particles comprises a thickness of 25 g/l to 90 g/l. In some embodiments of any of the foregoing methods, the washcoat composition comprising catalytically active particles comprises a thickness of 50 g/l to 250 g/l.

In some embodiments, the invention comprises a washcoat composition comprising a solids content of 35% to 95% by weight of catalytically active particles comprising composite nano-particles bonded to micron-sized carrier particles, and the composite nano-particles comprise a support nano-particle and a catalytic nano-particle; 2% to 5% by weight of boehmite particles; and 2% to 55% by weight of metal-oxide particles. In additional embodiments, the washcoat composition can further comprise up to 20% by weight of silica particles. In any of the foregoing embodiments of the washcoat composition, the metal oxide particles can be aluminum oxide particles. In any of the foregoing embodiments of the washcoat composition, the solids can be suspended in an aqueous medium at a pH between 3 and 5. In any of the foregoing embodiments of the washcoat composition, the washcoat composition can be substantially free of zeolites. In any of the foregoing embodiments of the washcoat composition, the catalytically active particles can comprise 92% by weight of the solids content. In any of the foregoing embodiments of the washcoat composition, the catalytically active particles can comprise at least one platinum group metal, such as platinum and palladium, such as platinum and palladium in a 2:1 Pt/Pd weight/weight ratio. In further embodiments of the invention, the invention comprises a coated substrate comprising a washcoat according to any of the foregoing embodiments. In further embodiments, the coated substrate also comprises a washcoat layer comprising zeolite particles.

In some embodiments, the invention comprises a method of forming a coated substrate, the method comprising a) coating a substrate with a washcoat composition comprising zeolite particles; and b) coating the substrate with a washcoat composition containing catalytically active particles according to any of the foregoing embodiments of the washcoat compositions. In one embodiment of the method, coating the substrate with the washcoat layer comprising zeolite particles is performed before coating the substrate with the washcoat layer comprising catalytically active particles. In another embodiment of the method, coating the substrate with the washcoat layer comprising catalytically active particles is performed before coating the substrate with the washcoat layer comprising zeolite particles. Any of the foregoing embodiments of the method can further comprise the step of coating the substrate with a corner-fill washcoat prior to both step a) and step b). In any of the foregoing embodiments of the method, the washcoat composition comprising zeolite particles can comprise a thickness of 25 g/l to 90 g/l. In any of the foregoing embodiments of the method, the washcoat composition comprising catalytically active particles can comprise a thickness of 50 g/l to 250 g/l.

In further embodiments, the invention comprises a catalytic converter comprising a coated substrate according to any of the foregoing embodiments of the coated substrate. In further embodiments, the invention comprises an exhaust treatment system comprising a conduit for exhaust gas and a catalytic converter comprising a coated substrate according to any of the foregoing embodiments of the coated substrate.

In further embodiments, the invention comprises a diesel vehicle comprising a catalytic converter comprising a coated substrate according to any of the foregoing embodiments of the coated substrate, such as a light-duty diesel vehicle.

In further embodiments, the invention comprises a diesel vehicle comprising a catalytic converter comprising between 3.0 g/l and 4.0 g/l of platinum group metal, wherein the vehicle complies with the European emission standard Euro 5. The diesel vehicle can be a light-duty diesel vehicle. In further embodiments, the invention comprises a diesel vehicle comprising a catalytic converter comprising between 3.0 g/l and 4.0 g/l of platinum group metal, wherein the vehicle complies with the European emission standard Euro 6. The diesel vehicle can be a light-duty diesel vehicle. In further embodiments of any of the foregoing embodiments of the vehicles, the catalytically active material in the catalytic converter comprises composite nano-particles bonded to micron-sized carrier particles, and the composite nano-particles comprise a support nano-particle and a catalytic nano-particle. In further embodiments of any of the foregoing embodiments of the vehicles, the catalytic converter comprises a coated substrate, said coated substrate having a washcoat comprising zeolite particles and a separate washcoat comprising the catalytically active material.

In further embodiments of any of the foregoing embodiments of the vehicles, the catalytic converter comprises a coated substrate comprising a substrate; a washcoat layer comprising zeolite particles; and a washcoat layer comprising catalytically active particles; wherein the catalytically active particles comprise composite nano-particles bonded to micron-sized carrier particles, and the composite nano-particles comprise a support nano-particle and a catalytic nano-particle. In one embodiment of any of the foregoing embodiments of the vehicles, the washcoat layer comprising zeolite particles is formed on top of the washcoat layer comprising catalytically active particles. In one embodiment of any of the foregoing embodiments of the vehicles, the washcoat layer comprising catalytically active particles is formed on top of the washcoat layer comprising zeolite particles. In further embodiments of any of the foregoing embodiments of the vehicles, the catalytic nano-particles can comprise at least one platinum group metal. In further embodiments of any of the foregoing embodiments of the vehicles, the catalytic nano-particles can comprise platinum and palladium, such as platinum and palladium in a weight ratio of 2:1 platinum:palladium. In further embodiments of any of the foregoing embodiments of the vehicles, the support nano-particles have an average diameter of 10 nm to 20 nm. In further embodiments of any of the foregoing embodiments of the vehicles, the catalytic nano-particles have an average diameter of between 1 nm and 5 nm. In further embodiments of any of the foregoing embodiments of the vehicles, the washcoat layer comprising zeolite particles can comprise metal-oxide particles and boehmite particles. In further embodiments of any of the foregoing embodiments of the vehicles, the metal-oxide particles can be aluminum-oxide particles. In further embodiments of any of the foregoing embodiments of the vehicles, the zeolite particles can comprise 60% to 80% by weight of the mixture of zeolite particles, metal-oxide particles, and boehmite particles in the washcoat layer comprising zeolite particles. In further embodiments of any of the foregoing embodiments of the vehicles, the boehmite particles can comprise 2% to 5% by weight of the mixture of zeolite particles, metal-oxide particles, and boehmite particles in the washcoat layer comprising zeolite particles. In further embodiments of any of the foregoing embodiments of the vehicles, the metal-oxide particles can comprise 15% to 38% by weight of the mixture of zeolite particles, metal-oxide particles, and boehmite particles in the washcoat layer comprising zeolite particles. In further embodiments of any of the foregoing embodiments of the vehicles, the washcoat layer comprising zeolite particles does not include platinum group metals. In further embodiments of any of the foregoing embodiments of the vehicles, the zeolite particles in the washcoat layer comprising zeolite particles can have a diameter of 0.2 microns to 8 microns. In further embodiments of any of the foregoing embodiments of the vehicles, the washcoat layer comprising catalytically active particles can further comprise boehmite particles and silica particles. In further embodiments of any of the foregoing embodiments of the vehicles, the catalytically active particles can comprise 35% to 95% by weight of the combination of the catalytically active particles, boehmite particles, and silica particles in the washcoat layer comprising catalytically active particles. In further embodiments of any of the foregoing embodiments of the vehicles, the silica particles can be present in an amount up to 20% by weight of the combination of the catalytically active particles, boehmite particles, and silica particles in the washcoat layer comprising catalytically active particles. In further embodiments of any of the foregoing embodiments of the vehicles, the boehmite particles can comprise 2% to 5% by weight of the combination of the catalytically active particles, the boehmite particles, and the silica particles in the washcoat layer comprising catalytically active particles. In further embodiments of any of the foregoing embodiments of the vehicles, the washcoat layer can comprise catalytically active particles comprises 92% by weight of the catalytically active particles, 3% by weight of the boehmite particles, and 5% by weight of the silica particles. In further embodiments of any of the foregoing embodiments of the vehicles, the substrate can comprise cordierite. In further embodiments of any of the foregoing embodiments of the vehicles, the substrate can comprise a honeycomb structure. In further embodiments of any of the foregoing embodiments of the vehicles, the washcoat layer comprising zeolite particles can have a thickness of 25 g/l to 90 g/l. In further embodiments of any of the foregoing embodiments of the vehicles, the washcoat layer comprising catalytically active particles can have a thickness of 50 g/l to 250 g/l. Any of the foregoing embodiments of the vehicles can further comprise a corner-fill layer deposited directly on the substrate.

Any of the embodiments described above and herein are suitable for use in diesel engines, such as light-duty diesel engines, and diesel vehicles, such as light-duty diesel vehicles.

It is understood that aspects and embodiments of the invention described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

The systems, compositions, substrates, and methods described herein, including any embodiment of the invention as described herein, may be used alone or may be used in combination with other systems, compositions, substrates, and methods.

BRIEF DESCRIPTION OF THE DRAWINGS

FIG. 1 illustrates a catalytic converter in accordance with some embodiments of the present invention, while FIG. 1A is a magnified view of a portion of the drawing of FIG. 1.

DETAILED DESCRIPTION OF THE INVENTION

Figure 1:
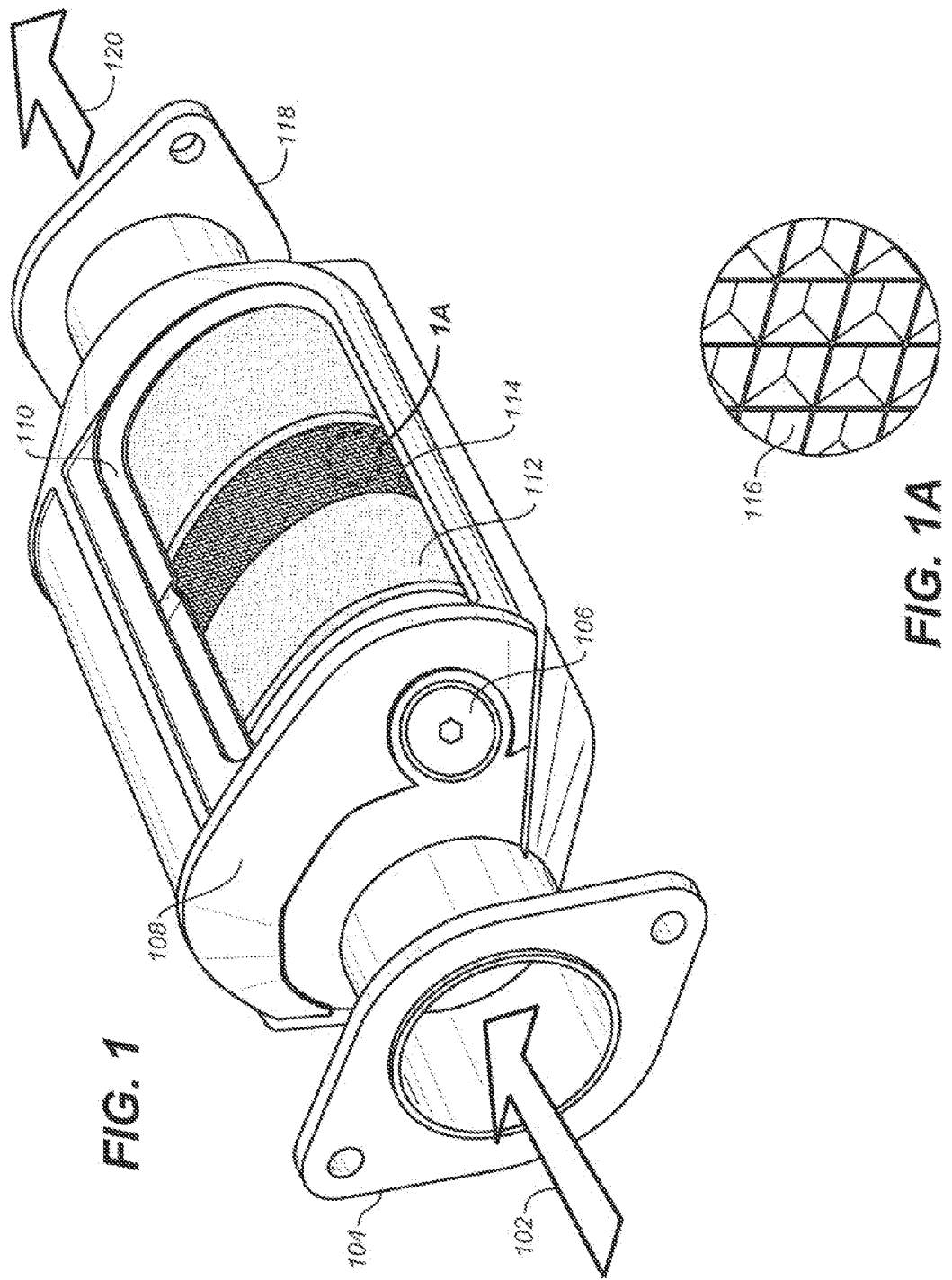

Described are composite nanoparticle catalysts, washcoat formulations, coated substrates, and catalytic converters. Also described are methods of making and using these composite nanoparticle catalysts, washcoat formulations, coated substrates, and catalytic converters. The invention also embraces catalyst-containing washcoat compositions, and methods of making the washcoats by combining the various washcoat ingredients. It has been found that the described composite nanoparticle catalysts and washcoat solutions provide for increased performed relative to prior catalysts and washcoat formulations when used to produce catalytic converters, allowing for the production of catalytic converters having reduced light-off temperatures, reduced emissions, and/or reduced platinum group metal loading requirements, as compared to catalytic converters having catalysts prepared using wet-chemistry methods.

It is understood that the coated substrates described herein, catalytic converters using the coated substrates described herein, and exhaust treatment systems using the coated substrates described herein, are particularly useful for diesel engines and diesel vehicles, especially light-duty diesel engines and light-duty diesel vehicles.

Composite nano-particles may include catalytic nanoparticles and support nanoparticles that are bonded together to form nano-on-nano composite nano particles. These composite nano particles may then be bonded to a micron-sized carrier particle to form micron sized catalytically active particles. The composite nano-particles may be produced, for example, in a plasma reactor in such a way that consistent nano-on-nano composite particles are produced. These composite particles are then bonded to micron-sized carrier particles to produce micron-sized catalytically active particles bearing composite nanoparticles, which may offer better initial (engine start-up) performance, better performance over the lifetime of the catalyst, and/or less reduction in performance over the life of the catalyst as compared to previous catalysts used in catalytic converters, such as catalysts prepared using wet-chemistry methods.

Further, the washcoat formulations may be formulated in order to provide one or more layers on a catalyst substrate, such as a catalytic converter substrate. In some embodiments, the washcoat formulations may form two or more layers in which catalytically active material, such as micron-sized catalytically active particles bearing composite nano particles, are in a separate layer than a layer containing a high concentration of zeolites. One embodiment, for example, is a multi-layer washcoat in which a first washcoat layer includes a relatively higher concentration of zeolites and a second, distinct washcoat layer includes a higher concentration of catalytically active material relative to the first layer. Preferably, the layer with the high concentration of zeolites includes no catalytically active material, and the second layer with the catalytically active material includes no zeolites. The order and placement of these two layers on a substrate may be changed in different embodiments and, in further embodiments, additional washcoat formulations/layers may also be used over, under, or between the washcoats, for example, a corner-fill washcoat layer which is initially deposited on the substrate to be coated. In other embodiments, the two layers can be directly disposed on each other, that is, there are no intervening layers between the first and second washcoat layers. The described washcoat formulations may include a lower amount of platinum group metals and/or offer better performance when compared to previous washcoat formulations, particularly when these washcoat formulations utilize the micron-sized particles bearing composite nano-particles.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. Additionally, it is contemplated that certain method steps can be performed in alternative sequences to those disclosed in the flowcharts.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

By "substantial absence of any platinum group metals" is meant that less than about 5%, less than about 2%, less than about 1%, less than about 0.5%, less than about 0.1%, less than about 0.05%, less than about 0.025%, or less than about 0.01% of platinum group metals are present by weight. Preferably, substantial absence of any platinum group metals indicates that less than about 1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication, or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, substantially each" of a specific component, a specific composition, a specific compound, or a specific ingredient is meant that at least about 99% of the specific component, the specific composition, the specific compound, or the specific ingredient is present by number or by weight.

This disclosure provides several embodiments. It is contemplated that any features from any embodiment can be combined with any features from any other embodiment. In this fashion, hybrid configurations of the disclosed features are within the scope of the present invention.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

This disclosure refers to both particles and powders. These two terms are equivalent, except for the caveat that a singular "powder" refers to a collection of particles. The present invention can apply to a wide variety of powders and particles. The terms "nano-particle" and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. Preferably, the nano-particles have an average grain size less than 250 nanometers and an aspect ratio between one and one million. In some embodiments, the nano-particles have an average grain size of about 50 nm or less, about 30 nm or less, or about 20 nm or less. In additional embodiments, the nano-particles have an average diameter of about 50 nm or less, about 30 nm or less, or about 20 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nano-particles have a grain size of about 50 nm or less, about 30 nm or less, or about 20 nm or less. In additional embodiments, the nano-particles have a diameter of about 50 nm or less, about 30 nm or less, or about 20 nm or less.

The terms "micro-particle," "micro-sized particle" "micron-particle," and "micron-sized particle" are generally understood to encompass a particle on the order of micrometers in diameter, typically between about 0.5 μm to 1000 μm, about 1 μm to 1000 μm, about 1 μm to 100 μm, or about 1 μm to 50 μm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

Composite Nanoparticle Catalyst

A composite nanoparticle catalyst may include a catalytic nanoparticle attached to a support nanoparticle to form a "nano-on-nano" composite nano-particle. Multiple nano-on-nano particles may then be bonded to a micron-sized carrier particle to form a composite micro/nanoparticle, that is, a micro-particle bearing composite nano-particles. These composite micro/nanoparticles may be used in washcoat formulations and catalytic converters as described herein. The use of these particles can reduce requirements for platinum group metal content and/or significantly enhance performance, particularly in terms of reduced light-off temperature, as compared with currently available commercial catalytic converters prepared by wet-chemistry methods. The wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to alumina micro-particles, followed by drying and calcining, resulting in precipitation of platinum onto the alumina. The platinum group metals deposited by wet-chemical methods onto metal oxide supports, such as alumina, are mobile at high temperatures, such as temperatures encountered in catalytic converters. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal catalysts are prepared by plasma-based methods. In one embodiment, the platinum group nano size metal particle is deposited on a nano sized metal oxide support, which has much lower mobility than the PGM deposited by wet chemistry methods. The resulting plasma-produced catalysts age at a much slower rate than the wet-chemistry produced catalysts. Thus, catalytic converters using plasma-produced catalysts can maintain a larger surface area of exposed catalyst to gases emitted by the engine over a longer period of time, leading to better emissions performance.

Production of Composite Nano-Particles by Plasma-Based Methods ("Nano-on-Nano" Particles or "NN" Particles)

The initial step in producing suitable catalysts may involve producing composite nano-particles. The composite nano-particles comprise a catalytic nano-particle comprising one or more platinum group metals, and a support nano-particle, typically a metal oxide such as aluminum oxide. As the name "nano-particle" implies, the nano-particles have sizes on the order of nanometers.

The composite nano-particles may be formed by plasma reactor methods, by feeding platinum group metal(s) and support material into a plasma gun, where the materials are vaporized. Plasma guns such as those disclosed in U.S. 2011/0143041 can be used, and techniques such as those disclosed in U.S. Pat. No. 5,989,648, U.S. Pat. No. 6,689,192, U.S. Pat. No. 6,755,886, and U.S. 2005/0233380 can be used to generate plasma. A working gas, such as argon, is supplied to the plasma gun for the generation of plasma; in one embodiment, an argon/hydrogen mixture (in the ratio of 10:2 $Ar/H_2$) is used as the working gas. The platinum group metal or metals, such as platinum, palladium, or platinum/palladium in any ratio, such as 2:1 platinum:palladium by weight, or about 2:1 platinum:palladium by weight, and which are generally in the form of metal particles of about 0.5 to 6 microns in diameter, can be introduced into the plasma reactor as a fluidized powder in a carrier gas stream such as argon. Metal oxide, typically aluminum oxide in a particle size of about 15 to 25 microns diameter, is also introduced as a fluidized powder in carrier gas. However, other methods of introducing the materials into the reactor can be used, such as in a liquid slurry. A composition of about 35% to 45% platinum group metal(s) and about 65% to 55% metal oxide (by weight) is typically used, preferably a ratio of about 40% platinum group metal(s) to about 60% metal oxide. Examples of ranges of materials that can be used are from about 0% to about 40% platinum, about 0% to about 40% palladium, and about 55% to about 65% aluminum oxide; in some embodiments, from about 20% to about 30% platinum, about 10% to about 15% palladium, and about 50% to about 65% aluminum oxide are used; in further embodiments, from about 23.3% to about 30% platinum, about 11.7% to about 15% palladium, and about 55% to about 65% aluminum oxide are used. An exemplary composition contains about 26.7% platinum, about 13.3% palladium, and about 60% aluminum oxide. Any solid or liquid materials are rapidly vaporized or turned into plasma. The kinetic energy of the superheated material, which can reach temperatures of 20,000 to 30,000 Kelvin, ensures extremely thorough mixing of all components.

The superheated material of the plasma stream is then quenched rapidly, using such methods as the turbulent quench chamber disclosed in U.S. 2008/0277267. Argon quench gas at high flow rates, such as 2400 to 2600 liters per minute, is injected into the superheated material. The material is further cooled in a cool-down tube, and collected and analyzed to ensure proper size ranges of material.

The plasma production method described above produces highly uniform composite nano-particles, where the composite nano-particles comprise a catalytic nano-particle bonded to a support nano-particle. The catalytic nano-particle comprises the platinum group metal or metals, such as Pt:Pd in a 2:1 ratio by weight. In some embodiments, the catalytic nano-particles have an average diameter or average grain size between approximately 0.3 nm and approximately 10 nm, preferably between approximately 1 nm to approximately 5 nm, that is, approximately 3 nm +/−2 nm. In some embodiments, the support nano-particles, comprising the metal oxide such as aluminum oxide, have an average diameter of approximately 20 nm or less, or approximately 15 nm or less, or between approximately 10 nm and approximately 20 nm, that is, approximately 15 nm +/−5 nm, or between approximately 10 nm and approximately 15 nm, that is, approximately 12.5 nm +/−2.5 nm. In some embodiments, the support nano-particles, comprising the metal oxide such as aluminum oxide, have a diameter of approximately 20 nm or less, or approximately 15 nm or less, or between approximately 10 nm and approximately 20 nm, that is, approximately 15 nm +/−5 nm, or between approximately 10 nm and approximately 15 nm, that is, approximately 12.5 nm +/−2.5 nm.

The Pt/Pd-alumina composite nanoparticles, when produced under reducing conditions, such as by using argon/hydrogen working gas, results in a partially reduced alumina surface on the support nano-particle to which the PGM nano-particle is bonded, as described in U.S. 2011/0143915 at paragraphs 0014-0022. The partially reduced alumina surface, or $Al_2O_{(3-x)}$ where x is greater than zero, but less than three, inhibits migration of the platinum group metal on the alumina surface at high temperatures. This in turn limits the agglomeration of platinum group metal when the particles are exposed to prolonged elevated temperatures. Such agglomeration is undesirable for many catalytic applications, as it reduces the surface area of PGM catalyst available for reaction.

The composite nano-particles comprising two nano-particles (catalytic or support) are referred to as "nano-on-nano" particles or "NN" particles.

Production of Micron-Sized Carrier Particles Bearing Composite Nano-Particles ("Nano-on-Nano-on-Micron" Particles or "NNm" Particles)

The composite nano-particles (nano-on-nano particles) may be further bonded to micron-sized carrier particles to produce composite micro/nano-particles, referred to as "nano-on-nano-on-micron" particles or "NNm" particles. The carrier particles are typically metal oxide particles, such as alumina ($Al_2O_3$). The micron-sized particles can have an average size between about 1 micron and about 100 microns, such as between about 1 micron and about 10 microns, between about 3 microns and about 7 microns, or between about 4 microns and about 6 microns.

In general, the nano-on-nano-on-micron particles are produced by a process of suspending the composite nano-particles (nano-on-nano particles) in water, adjusting the pH of the suspension to between about 2 and about 7, between about 3 and about 5, or about 4, adding surfactants to the suspension (or, alternatively, adding the surfactants to the water before suspending the composite nano-particles in the water), sonicating the composite nano-particle suspension, applying the suspension to micron-sized metal oxide particles until the point of incipient wetness, thereby impregnating the micron-sized particles with composite nano-particles, drying the micron-sized metal oxide particles which have been impregnated with composite nano-particles, and calcining the micron-sized metal oxide particles which have been impregnated with composite nano-particles.

Typically, the composite nano-particles are suspended in water, and the suspension is adjusted to have a pH of between about 2 and about 7, preferably between about 3 and about 5, more preferably a pH of about 4 (the pH is adjusted with acetic acid or another organic acid). Dispersants and/or surfactants are added to the composite nano-particles. Surfactants suitable for use include Jeffsperse® X3202 (Chemical Abstracts Registry No. 68123-18-2, and described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are nonionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant is added in a range of about 0.5% to about 5%, with about 2% being a typical value.

The mixture of aqueous surfactants and composite nano-particles is sonicated to disperse the composite nano-particles. The quantity of composite nano-particles particles in the dispersion is usually in the range of about 2% to about 15% (by mass). The dispersion is then applied to porous, micron sized $Al_2O_3$, which may be purchased from companies such as Rhodia or Sasol. The porous, micron sized, $Al_2O_3$ powders may be stabilized with a small percentage of lanthanum (about 2% to about 4% La). One commercial alumina powder suitable for use is MI-386, purchased from Grace Davison or Rhodia. The usable surface for this powder, defined by pore sizes greater than 0.28 μm, is approximately 2.8 m²/g. The ratio of composite nano-particles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nano-particles may be used with about 122 grams of carrier micro-particles. The aqueous dispersion of composite nano-particles is applied in small portions (such as by dripping or other methods) to the micron-sized powder until the point of incipient wetness, producing a material similar to damp sand.

The micron-sized carrier particles, impregnated with the composite nano-particles, may then be dried (for example, at about 30° C. to about 95° C., preferably about 60° C. to about 70° C., at atmospheric pressure or at reduced pressure such as from about 1 pascal to about 90,000 pascal). After drying, the particles may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nano-particles, also referred to as nano-on-nano-on-micron particles, or NNm particles. The drying step may be performed before the calcining step to remove the water before heating at the higher calcining temperatures; this avoids boiling of the water, which would disrupt the impregnated nano-particles which are lodged in the pores of the micron-sized carrier.

The NNm particles may contain from about 1% to about 6% PGM by weight, or in another embodiment from about 2% to about 3% by weight, or in another embodiment, about 2.5% by weight, of the total mass of the NNm particle. The NNm particles can then be used for formulations for coating substrates, where the coated substrates may be used in catalytic converters.

Examples of production of NNm material are described in the following co-owned patents and patent applications: U.S. Patent Publication No. 2005/0233380, U.S. Patent Publication No. 2006/0096393, U.S. patent application Ser. Nos. 12/151,810, 12/152,084, 12/151,809, U.S. Pat. No. 7,905,942, U.S. patent application Ser. No. 12/152,111, U.S. Patent Publication 2008/0280756, U.S. Patent Publication 2008/0277270, U.S. patent application Ser. Nos. 12/001,643, 12/474,081, 12/001,602, 12/001,644, 12/962,518, 12/962,473, 12/962,490, 12/969,264, 12/962,508, 12/965,745, 12/969,503, and 13/033,514, WO 2011/081834 (PCT/US2010/59763) and U.S. 2011/0143915 (U.S. patent application Ser. No. 12/962,473).

NNm Particles with Inhibited Migration of Platinum Group Metals

The NNm particles including an aluminum oxide micron-sized carrier particle bearing composite nano-particles, where the composite nano-particles are produced under reducing conditions, are particularly advantageous for use in catalytic converter applications. The platinum group metal of the catalytic nano-particle has a greater affinity for the partially reduced $Al_2O_{(3-x)}$ surface of the support nano-particle than for the $Al_2O_3$ surface of the micron-sized carrier particles. Thus, at elevated temperatures, neighboring PGM nanoparticles bound to neighboring $Al_2O_{(3-x)}$ support nano-particles are less likely to migrate on the $Al_2O_3$ micron-sized carrier particle surface and agglomerate into larger catalyst clumps. Since the larger agglomerations of catalyst have less surface area, and are less effective as catalysts, the inhibition of migration and agglomeration provides a significant advantage for the NNm particles. In contrast, platinum particles deposited by wet-chemical precipitation onto alumina support demonstrate higher mobility and migration, forming agglomerations of catalyst and leading to decreased catalytic efficacy over time (that is, catalyst aging).

Washcoat Compositions and Layers Using Nano-on-Nano-on-Micron Catalyst Particles:

Application to Substrates

Washcoat formulations comprising the nano-on-nano-on-micron particles (that is, the composite micro/nano-particles, which are the micron-sized carrier particles bearing composite nano-particles) may be used to provide one or more layers on a substrate used for catalysis, such as a catalytic converter substrate. Additional washcoats can also be used for improved performance. In some embodiments, the washcoat formulations may include two or more different washcoats formulations that allow for the separation of one or more washcoat layers containing high concentrations of zeolite particles from one or more washcoat layers containing platinum group metal catalyst, such as the NNm particles described above, on a catalytic converter substrate. The formulations may be used to form washcoat layers and catalytic converter substrates that include reduced amounts of platinum group metals and/or offer better performance when compared to previous washcoat layers and formulations and catalytic converter substrates.

Some embodiments of washcoat formulations may be formulated to form one or more of the following four basic washcoat layer configurations:

Substrate-Corner Fill-Catalytic Layer-Zeolite Layer (S-F-C-Z)

Substrate-Catalytic Layer-Zeolite Layer (S-C-Z)

Substrate-Corner Fill-Zeolite Layer-Catalytic Layer (S-F-Z-C)

Substrate-Zeolite Layer-Catalytic Layer (S-Z-C)

In the configurations above: 1) the Substrate (S) may be any substrate suitable for use in a catalytic converter, 2) the Zeolite Layer (Z) is a washcoat layer that includes a higher percentage of zeolite than the Catalytic layer, 3) the Catalytic Layer (C) is a washcoat layer that includes a higher percentage of catalytically active particles than the Zeolite Layer, and 4) the Corner Fill (F) is a filler layer that may be used to fill corners of the substrate prior to deposition of additional layers. In a preferable embodiment, the Zeolite Layer comprises no platinum group metal (or in alternative embodiments, is substantially free of platinum group metals) or catalytically active particles, and the Catalytic Layer contains no zeolites or is substantially free of zeolites.

It should be noted that, in some embodiments, additional washcoat layers can be disposed under, over, or between any of the washcoat layers indicated in these four basic configurations; that is, further layers can be present on the catalytic converter substrate in addition to the ones listed in the configurations above. In other embodiments, additional washcoat layers are not applied; that is, the washcoats listed in the configurations above are the only washcoats present on the catalytic converter substrate.

Various configurations of washcoat layers disposed on the substrate are depicted in the figures, such as FIGS. 3, 6, 8, and 9. The relative thickness of the substrate, washcoat layers, and other elements in the figures, such as FIGS. 3, 6, 8, and 9, are not drawn to scale.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may include a honeycomb structure, which provides numerous channels and results in a high surface area. The high surface area of the coated substrate with its applied washcoats in the catalytic converter provides for effective treatment of the exhaust gas flowing through the catalytic converter.

General Washcoat Preparation Procedure

Washcoats are prepared by suspending the designated materials in an aqueous solution, adjusting the pH to between about 2 and about 7, to between about 3 and about 5, or to about 4, and adjusting the viscosity, if necessary, using cellulose, cornstarch, or other thickeners, to a value between about 300 cP to about 1200 cP.

The washcoat is applied to the substrate (which may already have one or more previously-applied washcoats) by coating the substrate with the aqueous solution, blowing excess washcoat off of the substrate (and optionally collecting and recycling the excess washcoat blown off of the substrate), drying the substrate, and calcining the substrate.

Corner-Fill Washcoat Compositions and Layers

The corner fill washcoat layer (F) may be a relatively inexpensive layer, which can be applied to the substrate to fill up the "corners" and other areas of the substrate where exhaust gases are unlikely to penetrate in significant amounts. Preferably, this layer does not include any PGM or zeolites. The corner fill layer is schematically diagrammed in FIG. 9, which shows a single rectangular channel 900 in a substrate coated in the S-F-C-Z configuration. The wall 910 of the substrate channel has been coated with corner-fill washcoat layer 920, then catalyst-containing washcoat layer 930, then zeolite particle-containing washcoat layer 940. When the coated substrate is operating in the catalytic converter, exhaust gases pass through the lumen 950 of the channel. The corners of the channel (one of which, 960, is indicated by an arrow) have a relatively thick coating, and exhaust gases will be less likely to contact those regions. In, for example, the S-C-Z configuration, the layers 920 and 930 would be a single layer, the catalyst-containing washcoat layer, and significant amounts of expensive platinum group metal would be located in the corners (such as 960) where they are relatively inaccessible for catalysis. Thus, while the S-C-Z configuration can be used, it may not be as cost-effective. The corner fill washcoat layer may not provide an equivalent cost savings in the S-Z-C configuration, as zeolites are relatively inexpensive.

While a rectangular shape is shown for illustration, an equivalent analysis holds for any substrate with polygonal-shaped channels, or any substrate with channels that are not essentially cylindrical. For substrates with essentially cylindrical channels, which by definition do not have corners, a corner-fill washcoat may not be necessary for economic reasons (although it may still be applied for other reasons, such as to adjust the diameter of the channels).

The corner-fill washcoat compositions may comprise aluminum oxide particles (i.e., alumina). Aluminum-oxide particles such as MI-386 material from Grace Davison, or the like, for example, can be used. The size of the aluminum oxide particles is generally above about 0.2 microns, preferably above about 1 micron. The solids content of the corner-fill washcoat include about 80% to about 98% by weight porous alumina (MI-386 or the like) and about 20% to about 2% boehmite, such as about 90% to 97% alumina and about 10% to 3% boehmite, or about 95% to 97% alumina and about 5% to about 3% boehmite, such as a corner-fill washcoat including about 97% porous alumina and about 3% boehmite.

In some embodiments, each of the aluminum oxide particles or substantially each of the aluminum oxide particles in the corner-fill washcoat composition have a diameter of approximately 0.2 microns to approximately 8 microns, such as about 4 microns to about 6 microns. In some embodiments, the aluminum oxide particles in the corner-fill washcoat composition have an average grain size of approximately 0.2 microns to approximately 8 microns, such as about 4 microns to about 6 microns. In some embodiments, at least about 75%, at least about 80%, at least about 90%, or at least about 95% of the aluminum oxide particles in the corner-fill washcoat composition have a particle size falling within the range of approximately 0.2 microns to approximately 8 microns, such as within the range of about 4 microns to about 6 microns. After a washcoat layer has been applied to a substrate, it may be dried, then calcined, onto the substrate. The corner-fill washcoat may be applied in a thickness of from about 30 g/l up to about 100 g/l; a typical value may be about 50 g/l.

Zeolite Washcoat Compositions and Zeolite Layers

Zeolite particles may be used to trap hazardous gases, such as hydrocarbons, carbon monoxide, and nitrogen oxides, during cold start of an internal combustion engine. The Zeolite Layer (Z) is a washcoat layer, deposited using a washcoat composition that includes a higher percentage of zeolite than the Catalytic layer. In some embodiments, the Zeolite Layer and washcoat includes no catalytically active particles.

In some embodiments, the zeolite layer and washcoat compositions comprise, consist essentially of, or consist of zeolite particles, boehmite particles, and metal-oxide particles. The metal-oxide particles are preferably porous. The metal-oxide particles may be aluminum-oxide particles (e.g., MI-386 from Grace Davison or the like). The aluminum-oxide particles may be porous. Different configurations of the weight concentrations of the zeolite particles, boehmite particles, and metal-oxide particles may be employed. In the following descriptions, the percentages of the components of the washcoat compositions are provided in terms of the amount of solids present in the washcoat compositions, as the washcoat compositions can be provided in an aqueous suspension or, in some instances, as dry powder. The zeolite layer refers to the zeolite washcoat composition after it has been applied to the substrate, dried, and calcined.

In some embodiments, the zeolite particles comprise at least 50%, comprise more than about 50%, or comprise about 50% to about 100% by weight of the combination of zeolite particles, boehmite particles, and metal-oxide particles in the zeolite washcoat composition or zeolite layer. In some embodiments, the zeolite particles make up approximately 60% to approximately 80%, for example, approximately 65% to approximately 70% or approximately 70% to approximately 80%, by weight of the combination of zeolite particles, boehmite particles, and metal-oxide particles in the zeolite particle-containing washcoat composition or zeolite layer. In some embodiments, the zeolite particles in the zeolite particle-containing washcoat composition or zeolite layer each have a diameter of approximately 0.2 microns to approximately 8 microns, such as about 4 microns to about 6 microns, prior to coating. In some embodiments, at least about 75%, at least about 80%, at least about 90%, or at least about 95% of the zeolite particles in the zeolite particle-containing washcoat composition or zeolite layer have a particle size falling with the range of approximately 0.2 microns to approximately 8 microns, such as within the range of about 4 microns to about 6 microns. In some embodiments, the boehmite particles make up approximately 2% to approximately 5% by weight of the combination of zeolite particles, boehmite particles, and metal-oxide particles in the zeolite particle-containing washcoat composition or zeolite layer. In some embodiments, the boehmite particles make up approximately 3% by weight of the combination of zeolite particles, boehmite particles, and metal-oxide particles in the zeolite particle-containing washcoat composition or zeolite layer. In some embodiments, the metal-oxide particles make up approximately 15% to approximately 38%, for example, approximately 15% to approximately 30%, approximately 17% to approximately 23% or approximately 17% to approximately 22%, by weight of the mixture of zeolite particles, metal-oxide particles, and boehmite particles in the zeolite particle-containing washcoat composition or zeolite layer. In some embodiments, the metal-oxide particles make up approximately 15% to approximately 23% by weight of the mixture of zeolite particles, metal-oxide particles, and boehmite particles in the zeolite particle-containing washcoat composition or zeolite layer. In some embodiments, the metal-oxide particles make up approximately 25% to approximately 35% by weight of the mixture of zeolite particles, metal-oxide particles, and boehmite particles in the zeolite particle-containing washcoat composition or zeolite layer. In some embodiments, the zeolite-particle containing washcoat composition or zeolite layer contains about 3% boehmite particles, about 67% zeolite particles, and about 30% porous aluminum-oxide particles.

In some embodiments, the zeolite particle-containing washcoat composition or zeolite layer does not comprise any platinum group metals. As discussed above, the six platinum group metals are ruthenium, rhodium, palladium, osmium, iridium, and platinum. In some embodiments, the zeolite particle-containing washcoat composition or zeolite layer is characterized by a substantial absence of any platinum group metals. In some embodiments, the zeolite particle-containing washcoat composition or zeolite layer is 100% free of any platinum group metals. In some embodiments, the zeolite particle-containing washcoat composition or zeolite layer is approximately 100% free of any platinum group metals. In some embodiments, the zeolite particle-containing washcoat composition or zeolite layer does not comprise any catalytic particles. In some embodiments, the zeolite particle-containing washcoat composition or zeolite layer is characterized by a substantial absence of any catalytic particles. In some embodiments, the zeolite particle-containing washcoat composition or zeolite layer is 100% free of any catalytic particles. In some embodiments, the zeolite particle-containing washcoat composition or zeolite layer is approximately 100% free of any catalytic particles.

In some embodiments, the zeolite particle-containing washcoat composition or zeolite layer may include by weight about 2% to about 5% boehmite particles, about 60% to about 80% zeolite particles, and the rest porous aluminum-oxide particles (i.e., about 15% to about 38%). In one embodiment, the zeolite particle-containing washcoat composition or zeolite layer includes by weight about 2% to about 5% boehmite particles, about 75% to about 80% zeolite particles, and the rest porous aluminum-oxide particles (i.e., about 15% to about 23%). In another embodiments, the zeolite particle-containing washcoat composition or zeolite layer includes by weight about 2% to about 5% boehmite particles, about 65% to about 70% zeolite particles, and the rest porous aluminum-oxide particles (i.e., about 25% to about 33%). In some embodiment, the zeolite-particle containing washcoat composition or zeolite layer contains about 3% boehmite particles, about 67% zeolite particles, and about 30% porous aluminum-oxide particles. In some embodiments, the zeolite particle-containing washcoat composition or zeolite layer does not contain any catalytic material. In some embodiments, the zeolite particle-containing washcoat composition or zeolite layer does not contain any platinum group metals.

In some embodiments, the zeolite particle-containing washcoat composition is mixed with water and acid, such as acetic acid, prior to coating of a substrate with the zeolite particle-containing washcoat composition, thereby forming an aqueous mixture of the zeolite particle-containing washcoat composition, water, and acid. This aqueous mixture of the zeolite particle-containing washcoat composition, water, and acid may then be applied to the substrate (where the substrate may or may not already have other washcoat layers applied to it). In some embodiments, the pH of this aqueous mixture may be adjusted to a pH level of about 2 to about 7 prior to it being applied to the substrate. In some embodiments, the pH of this aqueous mixture may be adjusted to a pH level of about 4 prior to it being applied to the substrate.

In some embodiments, the zeolite layer (that is, the zeolite particle-containing washcoat composition applied to the substrate, or the zeolite-particle containing washcoat layer) has a thickness of approximately 25 g/l to approximately 90 g/l (grams/liter), approximately 50 g/l to approximately 80 g/l, or approximately 70 to approximately 90 g/l. In some embodiments, the zeolite layer has a thickness of approximately 50 g/l, 60 g/l, 70 g/l, 80 g/l, or 90 g/l. In some embodiments, the zeolite layer has a thickness of approximately 80 g/l.

In some embodiments, where the zeolite layer is applied on top of the catalyst-containing layer (i.e., the catalyst-containing layer is closer to the substrate than the zeolite layer), the zeolite layer has a thickness of about 70 g/l to about 90 g/l.

In some embodiments, where the zeolite layer is applied under the catalyst-containing layer (i.e., the zeolite layer is closer to the substrate than the catalyst-containing layer), the zeolite layer has a thickness of about 50 g/l to about 80 g/l.

Catalytic Active Particle-Containing Washcoat Compositions and Catalytically Active Layers The catalyst-containing washcoat composition and the catalyst layer on the substrate, contains catalytically active material and can be formed in a variety of ways. Preferred catalysts are platinum group metals (PGMs). Platinum group metals are the metals platinum, palladium, rhodium, ruthenium, osmium, and iridium. The individual metals can be used as catalysts, and various combinations of metals can also be used. For example, the NNm micron-sized particles described above are preferably used. The catalytically active particles may have composite nano-particles, where the composite nanoparticles have a population of support nano-particles bearing catalytic nano-particles comprising platinum and a population of support nano-particles bearing catalytic nano-particles comprising palladium. The micron-sized support particles bearing composite particles may include support nano-particles bearing catalytic nano-particles, where the catalytic nanoparticles include a platinum/palladium alloy, such as a 2:1 Pt/Pd ratio (weight/weight). In some embodiments, the micron-sized carrier particles are alumina (aluminum oxide) particles on which a plurality of composite nano-particles are attached, the composite nano-particles comprising a support nano-particle and a catalytic nano-particle. In one embodiment, MI-386 alumina powder from Grace Davison is used as the micron-sized alumina particles.

In the following descriptions, the percentages of the components of the washcoat compositions are provided in terms of the amount of solids present in the washcoat compositions, as the washcoat compositions can be provided in an aqueous suspension or, in some instances, as dry powder. The catalyst layer (or catalyst-containing layer) refers to the catalyst-containing washcoat composition after it has been applied to the substrate, dried, and calcined.

The previously described zeolite-particle containing washcoat compositions and zeolite-particle containing layers are preferably free of, or in an alternative embodiment, substantially free of, catalytic particles or platinum group metals. It is preferred that the catalyst-containing washcoat compositions and layers are free of, or substantially free of, zeolites. However, in some embodiments, the catalyst-containing washcoat compositions and catalyst layers can contain an amount of zeolites, such as up to about 20%, up to about 10%, or up to about 5% of the total solids in the catalyst-containing washcoat compositions or catalyst-containing layers.

In some embodiments, the catalyst-containing washcoat composition further includes "spacer" or "filler" particles, where the spacer particles may be ceramic, metal oxide, or metallic particles. In some embodiments, the spacer particles may be silica, alumina, boehmite, or zeolite particles, or any mixture of the foregoing, such as boehmite particles, silica particles and zeolite particles in any proportion.

In some embodiments where the catalyst-containing washcoat composition and catalyst layers are substantially free of zeolites, the catalyst-containing washcoat composition comprises, consists essentially of, or consists of silica particles, boehmite particles, and NNm particles. In some embodiments, the NNm particles make up between approximately 35% to approximately 95% by weight of the combination of the NNm particles, the boehmite particles, and the silica particles in the catalyst-containing washcoat composition or catalyst-containing layer. In some embodiments, the NNm particles make up between approximately 40% to approximately 92% by weight of the combination of the NNm particles, the boehmite particles, and the silica particles in the catalyst-containing washcoat composition or catalyst-containing layer. In some embodiments, the NNm particles make up between approximately 60% to approximately 95% by weight of the combination of the NNm particles, the boehmite particles, and the silica particles in the catalyst-containing washcoat composition or catalyst-containing layer. In some embodiments, the NNm particles make up between approximately 80% to approximately 95% by weight of the combination of the NNm particles, the boehmite particles, and the silica particles in the catalyst-containing washcoat composition or catalyst-containing layer. In some embodiments, the NNm particles make up between approximately 80% to approximately 92% by weight of the combination of the NNm particles, the boehmite particles, and the silica particles in the catalyst-containing washcoat composition or catalyst-containing layer. In some embodiments, the NNm particles make up approximately 92% by weight of the combination of the NNm particles, the boehmite particles, and the silica particles in the catalyst-containing washcoat composition or catalyst-containing layer.

In some embodiments, the percentage of platinum group metal in the catalyst-containing washcoat composition and catalyst layers ranges from between about 0.25% to about 4%, about 0.5% to about 4%, about 0.5% to about 3%, about 1% to about 3%, about 1% to about 2%, about 1% to about 1.5%, about 1.5% to about 3%, about 1.5% to about 2.5%, about 1.5% to about 2%, about 2% to about 3%, about 2.5% to about 3%, or about 2% to about 2.5%. In some embodiments, the percentage of platinum group metal in the catalyst-containing washcoat composition and catalyst layers is about 0.5%, about 0.75%, about 1%, about 1.25%, about 1.5%, about 1.75%, about 2%, about 2.25%, about 2.5%, about 2.75%, or about 3%. In some embodiments, the percentage of platinum group metal in the catalyst-containing washcoat composition and catalyst layers is about 2.3%.

In some embodiments, the silica particles make up approximately 20% or less by weight of the combination of the nano-on-nano-on-micron particles, the boehmite particles, and the silica particles in the catalyst-containing washcoat composition or catalyst-containing layer; or the silica particles make up approximately 10% or less by weight of the combination of the nano-on-nano-on-micron particles, the boehmite particles, and the silica particles in the catalyst-containing washcoat composition or catalyst-containing layer; in further embodiments, the silica particles make up approximately 5% or less by weight of the combination of the nano-on-nano-on-micron particles, the boehmite particles, and the silica particles in the catalyst-containing washcoat composition or catalyst-containing layer. In various embodiments, the silica particles make up approximately 1% to approximately 20%, approximately 1% to approximately 10%, approximately 1% to approximately 5%, about 20%, about 10%, about 5%, or about 1% by weight of the combination of the nano-on-nano-on-micron particles, the boehmite particles, and the silica particles in the catalyst-containing washcoat composition or catalyst-containing layer. In some embodiments, the boehmite particles make up approximately 2% to approximately 5% by weight of the combination of the nano-on-nano-on-micron particles, the boehmite particles, and the silica particles in the catalyst-containing washcoat composition or catalyst-containing layer. In some embodiments, the boehmite particles make up approximately 3% by weight of the combination of the nano-on-nano-on-micron particles, the boehmite particles, and the silica particles in the catalyst-containing washcoat composition or catalyst-containing layer.

In some embodiments, the catalyst-containing washcoat composition or catalyst-containing layer further comprises metal-oxide particles, such as the metal oxide particles discussed above (e.g., porous metal-oxides, aluminum-oxides, porous aluminum-oxides, etc.). In some embodiments, these metal-oxide particles further comprise up to approximately 65%, up to approximately 60%, up to approximately 55%, or up to approximately 54%, such as approximately 2% to approximately 54%, by weight of the combination of the nano-on-nano-on-micron particles, the boehmite particles, the silica particles, and the metal-oxide particles in the catalyst-containing washcoat composition or catalyst-containing layer. It is contemplated that the concentration ranges discussed above for the nano-on-nano-on-micron particles, the boehmite particles, and the silica particles can be applied to the combination of those materials with the metal-oxide particles.

In other embodiments, the catalyst-containing washcoat composition or catalyst-containing layer comprises, consists essentially of, or consists of zeolite particles, boehmite particles, and nano-on-nano-on-micron particles. In some embodiments, the nano-on-nano-on-micron particles make up between approximately 35% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 40% to approximately 92% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 60% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 80% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 80% to approximately 92% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up approximately 92% by weight of the combination of the nano-on-nano-on-micron particles, the boehmite particles, and the zeolite particles in the catalyst-containing washcoat composition or catalyst-containing layer. In some embodiments, the zeolite particles make up less than approximately 20%, less than approximately 10%, or less than approximately 5%, by weight of the combination of the nano-on-nano-on-micron particles, the boehmite particles, and the zeolite particles in the catalyst-containing washcoat composition or catalyst-containing layer. In some embodiments, the zeolite particles make up approximately 1% to approximately 5% by weight, such as about 5% by weight, of the combination of the nano-on-nano-on-micron particles, the boehmite particles, and the zeolite particles in the catalyst-containing washcoat composition or catalyst-containing layer. In some embodiments, the boehmite particles make up approximately 2% to approximately 5% by weight of the combination of the nano-on-nano-on-micron particles, the boehmite particles, and the zeolite particles in the catalyst-containing washcoat composition or catalyst-containing layer. In some embodiments, the boehmite particles make up approximately 3% by weight of the combination of the nano-on-nano-on-micron particles, the boehmite particles, and the zeolite particles in the catalyst-containing washcoat composition or catalyst-containing layer.

In some embodiments, the catalyst-containing washcoat composition or catalyst-containing layer further includes metal-oxide particles, such as the metal oxide particles discussed above (e.g., porous metal-oxides, aluminum-oxides, porous aluminum-oxides, etc.). In some embodiments, these metal-oxide particles make up approximately 0% to approximately 54%, such as approximately 2% to approximately 54%, by weight of the combination of the nano-on-nano-on-micron particles, the boehmite particles, the zeolite particles, and the metal-oxide particles in the catalyst-containing washcoat composition or catalyst-containing layer. It is contemplated that the concentration ranges discussed above for the nano-on-nano-on-micron particles, the boehmite particles, and the zeolite particles can be applied to the combination of those materials with the metal-oxide particles.

In some embodiments, the catalyst-containing washcoat composition is mixed with water and acid, such as acetic acid, prior to the coating of the substrate with the catalyst-containing washcoat composition, thereby forming an aqueous mixture of the catalyst-containing washcoat composition, water, and acid. This aqueous mixture of the catalyst-containing washcoat composition, water, and acid is then applied to the substrate (where the substrate may or may not already have other washcoat layers applied to it). In some embodiments, the pH of this aqueous mixture is adjusted to a pH level of about 2 to about 7 prior to it being applied to the substrate. In some embodiments, the pH of this aqueous mixture is adjusted to a pH level of about 4 prior to it being applied to the substrate. In some embodiments, the viscosity of the aqueous washcoat is adjusted by mixing with a cellulose solution, with corn starch, or with similar thickeners. In some embodiments, the viscosity is adjusted to a value between about 300 cP to about 1200 cP.

In some embodiments, the catalyst-containing washcoat composition comprises a thickness of approximately 50 g/l to approximately 250 g/l, such as approximately 50 g/l to approximately 140 g/l, approximately 70 g/l to approximately 140 g/l, approximately 90 g/l to approximately 140 g/l, or approximately 110 g/l to approximately 130 g/l. In some embodiments, the catalyst-containing washcoat composition comprises a thickness of approximately 50 g/l, approximately 60 g/l, approximately 70 g/l, approximately 80 g/l, approximately 90 g/l, approximately 100 g/l, approximately 110 g/l, approximately 120 g/l, approximately 130 g/l, or approximately 140 g/l. Preferably, the catalyst-containing washcoat composition comprises a thickness of approximately 120 g/l.

Drying and Calcining Conditions

Once each washcoat is applied to the substrate (which may or may not have already been coated with previous substrates), excess washcoat is blown off and the residue collected and recycled. The washcoat may then be dried. Drying of the washcoats can be performed at room temperature or elevated temperature (for example, from about 30° C. to about 95° C., preferably about 60° C. to about 70° C.), at atmospheric pressure or at reduced pressure (for example, from about 1 pascal to about 90,000 pascal, or from about 7.5 mTorr to about 675 Torr), in ambient atmosphere or under an inert atmosphere (such as nitrogen or argon), and with or without passing a stream of gas over the substrate (for example, dry air, dry nitrogen gas or dry argon gas). In some embodiments, the drying process is a hot-drying process. A hot drying process includes any way to remove the solvent at a temperature greater than room temperature, but at a temperature below a standard calcining temperature. In some embodiments, the drying process may be a flash drying process, involving the rapid evaporation of moisture from the substrate via a sudden reduction in pressure or by placing the substrate in an updraft of warm air. It is contemplated that other drying processes may also be used.

After drying the washcoat onto the substrate, the washcoat may then be calcined onto the substrate. Calcining takes place at elevated temperatures, such as from 400° C. to about 700° C., preferably about 500° C. to about 600° C., more preferably at about 540° C. to about 560° C. or at about 550° C. Calcining can take place at atmospheric pressure or at reduced pressure (for example, from about 1 pascal to about 90,000 pascal, or about 7.5 mTorr to about 675 Torr), in ambient atmosphere or under an inert atmosphere (such as nitrogen or argon), and with or without passing a stream of gas over the substrate (for example, dry air, dry nitrogen gas, or dry argon gas).

Catalytic Converters and Methods of Producing Catalytic Converters

In some embodiments, the invention provides for catalytic converters, which can comprise any of the washcoat layers and washcoat configurations described herein. The catalytic converters are useful in a variety of applications, such as in diesel vehicles, such as in light-duty diesel vehicles.

FIG. 1 illustrates a catalytic converter in accordance with some embodiments. Catalytically active material is included in a washcoat composition, which is coated onto a substrate to form a coated substrate. The coated substrate 114 is enclosed within an insulating material 112, which in turn is enclosed within a metallic container 110 (of, for example, stainless steel). A heat shield 108 and a gas sensor (for example, an oxygen sensor) 106 are depicted. The catalytic converter may be affixed to the exhaust system of the vehicle through flanges 104 and 118. The exhaust gas, which includes the raw emissions of hydrocarbons, carbon monoxide, and nitrogen oxides, enters the catalytic converter at 102. As the raw emissions pass through the catalytic converter, they react with the catalytically active material on the coated substrate, resulting in tailpipe emissions of water, carbon dioxide, and nitrogen exiting at 120. FIG. 1A is a magnified view of a section of the coated substrate 114, which shows the honeycomb structure of the coated substrate. The coated substrates, which are discussed in further detail below, may be incorporated into a catalytic converter for use in a vehicle emissions control system.

FIGS. 2-8 illustrate various methods of forming coated substrates for use in a catalytic converter. Any of the catalyst-containing washcoats or zeolite particle-containing washcoats disclosed herein can be used in these illustrative methods. Any of the corner-fill washcoats disclosed herein can be used in any of the illustrative methods where a corner-fill washcoat is used.

Figure 2:
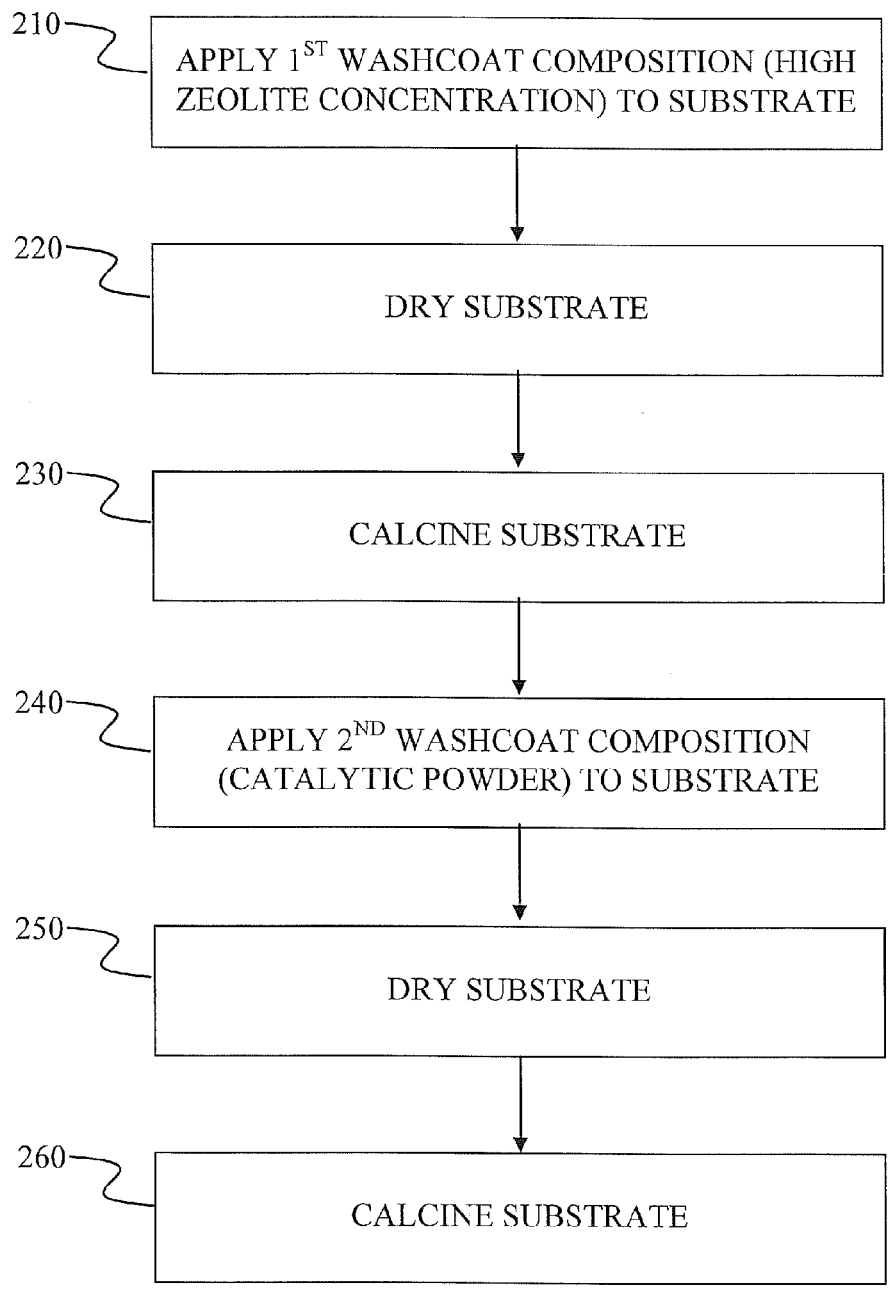
FIG. 2 illustrates a method of forming a coated substrate in accordance with some embodiments of the present invention.

FIG. 2 illustrates a method 200 of forming a coated substrate in accordance with some embodiments of the present invention. The method comprises coating a substrate with a zeolite particle-containing washcoat composition, wherein the zeolite particle-containing washcoat composition comprises zeolite particles in high concentration; and coating the resulting coated substrate with a catalyst-containing washcoat composition to form the coated substrate, wherein the catalyst-containing washcoat composition comprises catalytic powder. Preferably, a drying process and a calcining process are performed between each coating step. This configuration is designated S-Z-C (substrate-zeolite layer-catalyst layer).

At step 210, a first washcoat composition, a zeolite particle-containing composition, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 220, a first drying process is performed on the substrate. Examples of such drying processes include, but are not limited to, a hot-drying process, or a flash drying process.

At step 230, a first calcining process is performed on the substrate. It is contemplated that the length and temperature of the calcination process can vary depending on the characteristics of the components in a particular embodiment.

At step 240, a second washcoat composition, a catalyst-containing washcoat composition, is applied to the substrate in order to coat the first washcoat layer with a second washcoat layer.

At step 250, a second drying process is performed on the substrate. Examples of such drying processes include, but are not limited to, a hot-drying process, or a flash drying process.

At step 260, a second calcining process is performed on the substrate. It is contemplated that the length and temperature of the calcination process can vary depending on the characteristics of the components in a particular embodiment.

After the second calcining process, the coated substrate includes a first layer and a second layer on its surface. The first layer includes a high concentration of zeolites. The second layer, disposed over the first layer, includes catalytic material. This method illustrates the production of the Substrate-Zeolite Particles-Catalytic Powder configuration (S-Z-C) without additional washcoat layers; the method can be readily modified to apply additional washcoat layers as desired, before or after any step illustrated. Preferably, a drying process and a calcining process are performed between each coating step.

Figure 3A:
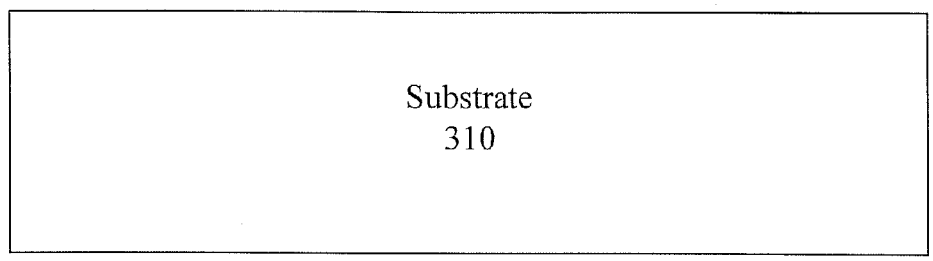
FIGS. 3A-C illustrate formation of a coated substrate at different stages of a washcoat coating method in accordance with some embodiments of the present invention.
Figure 3B:
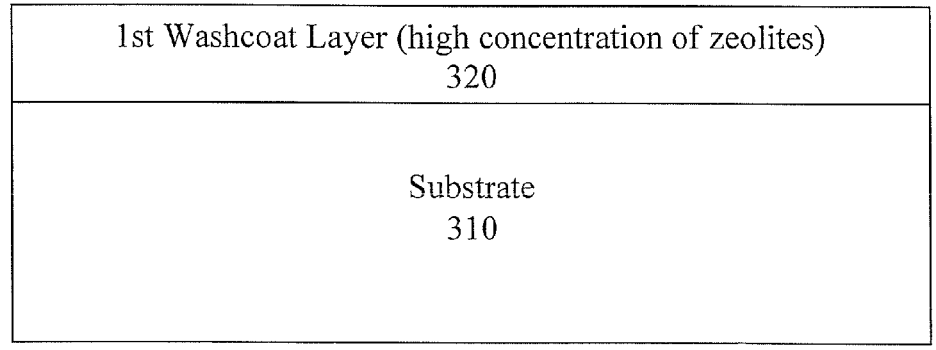
Figure 3C:
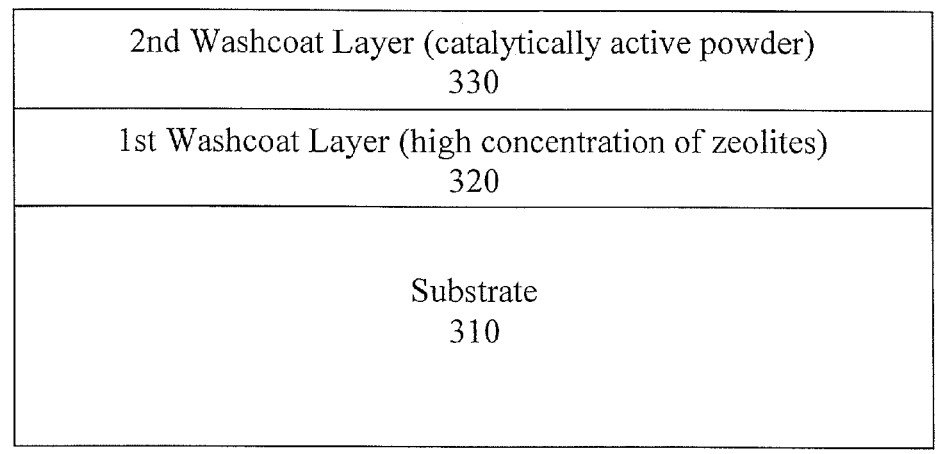

FIGS. 3A-C illustrate the production of a coated substrate at different stages of a washcoat coating method in accordance with some embodiments of the present invention.

FIG. 3A illustrates a substrate 310 prior to being coated with the first washcoat composition. Preferably, the substrate 310 comprises, consists essentially of, or consists of cordierite and comprises a honeycomb structure. However, it is contemplated that other configurations of the substrate 310 are also within the scope of the present invention. It should be noted that the depiction of substrate 310 in FIGS. 3A-C illustrates only a portion of the surface being coated, and thus the subsequent washcoat layers illustrated as being coated onto this portion of the substrate are shown as only coating the top surface of the portion of the substrate. If the depiction of the substrate 310 in FIGS. 3A-C had been meant to illustrate the entire substrate, the washcoat layers would be shown as coating the entire surface of the substrate, and not just the top surface, as is depicted in FIGS. 3A-C for the portion of the substrate shown.

FIG. 3B illustrates the substrate 310 after its surface has been coated with a zeolite particle-containing washcoat composition, as discussed in the process depicted in FIG. 2. The first washcoat composition including zeolite particles can be applied, dried, and calcined. A resulting first washcoat layer 320 is formed on the surface of the substrate 310. This first washcoat layer 320 includes a high concentration of zeolite particles.

FIG. 3C illustrates the substrate 310 after the first washcoat layer 320 has been coated with a second washcoat composition, as discussed in the process depicted in FIG. 2. The second washcoat composition containing catalytic powder can be applied, dried, and calcined. As a result, a second washcoat layer 330 is formed over the first washcoat layer 320. This second washcoat layer 330 comprises catalytically active powder. This coated substrate is in the Substrate-Zeolite Particles-Catalytic Powder configuration (S-Z-C) without additional washcoat layers; additional washcoat layers can be included as desired, under, over, or between any layers illustrated.

Figure 5:
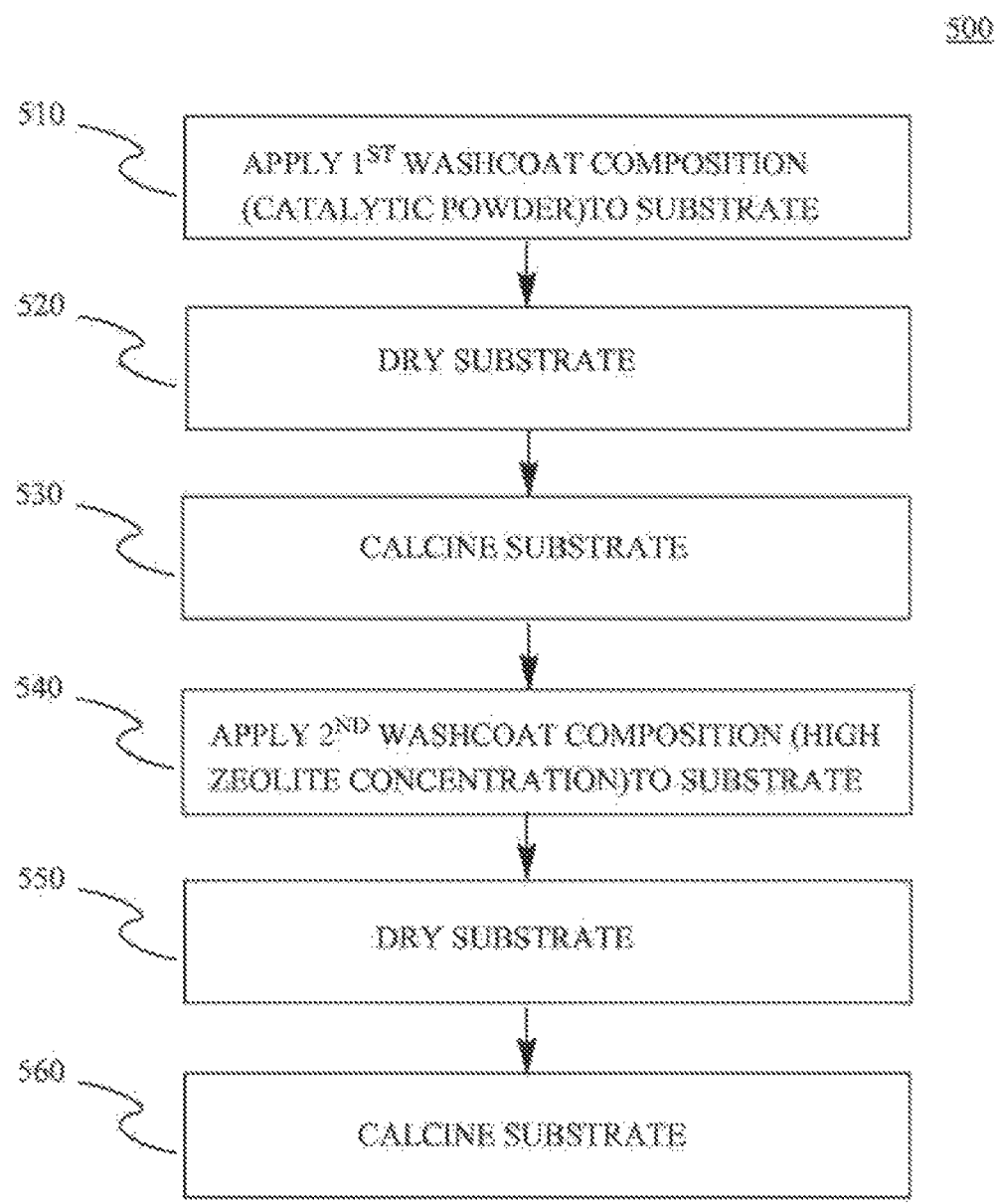
FIG. 5 illustrates a method of forming a coated substrate in accordance with some embodiments of the present invention.

FIG. 5 illustrates a method 500 of forming a coated substrate in accordance with some embodiments. The method comprises: coating a substrate with a washcoat composition which comprises a composition comprising catalytic particles (referred to as a catalyst-containing washcoat composition, a catalytically active powder-containing washcoat composition, or a catalyst powder-containing washcoat composition) to form a catalytic particle-coated substrate; and coating the resulting catalytic particle-coated substrate with yet another subsequent washcoat composition which comprises zeolite particles in high concentration (referred to as a zeolite particle-containing washcoat composition), to form the fully coated substrate, which is a catalytic particle-coated/zeolite particle-coated substrate. Preferably, a drying process and a calcining process are performed between each coating step. This configuration is designated S-C-Z (substrate-catalyst layer-zeolite layer).

At step 510, a first washcoat composition, a catalytic powder-containing composition, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 520, a first drying process is performed on the substrate. Examples of such drying processes include, but are not limited to, a hot-drying process, or a flash drying process.

At step 530, a first calcining process is performed on the substrate. It is contemplated that the length and temperature of the calcination process can vary depending on the characteristics of the components in a particular embodiment.

At step 540, a second washcoat composition, a zeolite particle-containing washcoat composition, is applied to the substrate in order to coat the first washcoat layer with a second washcoat layer.

At step 550, a second drying process is performed on the substrate. Examples of such drying processes include, but are not limited to, a hot-drying process, or a flash drying process.

At step 560, a second calcining process is performed on the substrate. It is contemplated that the length and temperature of the calcination process can vary depending on the characteristics of the components in a particular embodiment.

After the second calcining process, the coated substrate comprises a first layer and a second layer on its surface. The first layer comprises catalytic material. The second layer, disposed over the first layer, comprises a high concentration of zeolite. This method illustrates the production of the Substrate-Catalytic Powder-Zeolite Particles configuration (S-C-Z) without additional washcoat layers; the method can be readily modified to apply additional washcoat layers as desired, before or after any step illustrated.

Figure 6A:
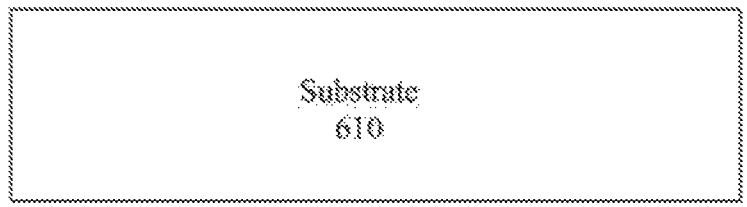
FIGS. 6A-C illustrate formation of a coated substrate at different stages of a washcoat coating method in accordance with some embodiments of the present invention.
Figure 6B:
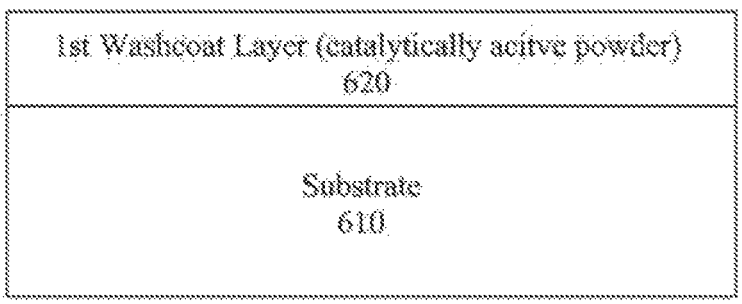
Figure 6C:
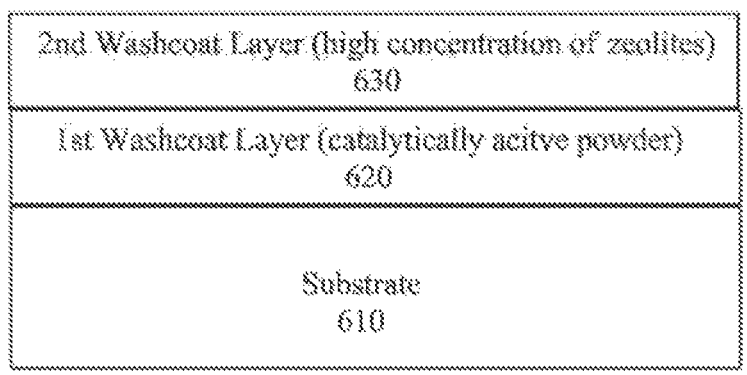

FIGS. 6A-C illustrate the production of a coated substrate at different stages of a washcoat coating method in accordance with some embodiments.

FIG. 6A illustrates a substrate 610 prior to being coated with the first washcoat composition. Preferably, the substrate 610 comprises, consists essentially of, or consists of cordierite and comprises a honeycomb structure. However, it is contemplated that other configurations of the substrate 610 are also within the scope of the present invention. It should be noted that the depiction of substrate 610 in FIGS. 6A-C illustrates only a portion of the surface being coated, and thus the subsequent washcoat layers illustrated as being coated onto this portion of the substrate are shown as only coating the top surface of the portion of the substrate. If the depiction of the substrate 610 in FIGS. 6A-C had been meant to illustrate the entire substrate, the washcoat layers would be shown as coating the entire surface of the substrate, and not just the top surface, as is depicted in FIGS. 6A-C for the portion of the substrate shown.

FIG. 6B illustrates the substrate 610 after its surface has been coated with a catalyst-containing washcoat composition, as discussed in the process depicted in FIG. 5. The first washcoat composition containing catalytic powder can be applied, dried, and calcined. A resulting first washcoat layer 620 is formed on the surface of the substrate 610. This first washcoat layer 620 comprises catalytic powder.

FIG. 6C illustrates the substrate 610 after the first washcoat layer 620 has been coated with a second washcoat composition, as discussed in the process depicted in FIG. 5. The second washcoat composition containing zeolite particles can be applied, dried, and calcined. As a result, a second washcoat layer 630 is formed over the first washcoat layer 620. This second washcoat layer 630 comprises zeolite particles, preferably in a high concentration. This coated substrate is in the Substrate-Catalytic Powder-Zeolite Particles configuration (S-C-Z) without additional washcoat layers; additional washcoat layers can be included as desired, under, over, or between any layers illustrated.

Figure 7:
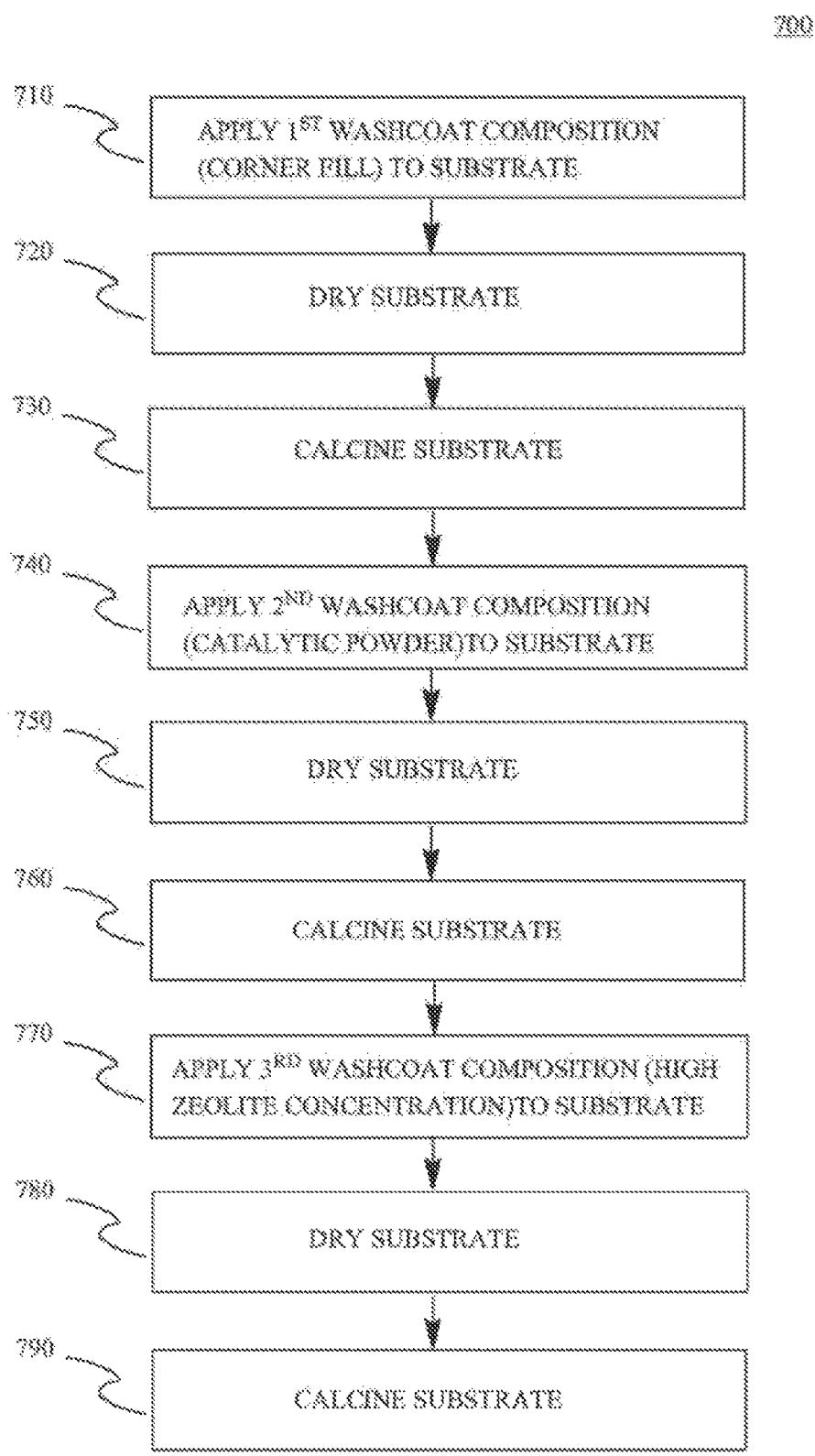
FIG. 7 illustrates a method of forming a coated substrate in accordance with some embodiments of the present invention.

FIG. 7 illustrates a method 700 of forming a coated substrate in accordance with some embodiments. The method comprises coating a substrate with a washcoat composition which comprises a corner-fill washcoat composition comprising alumina; coating the resulting corner-fill-coated substrate with a subsequent washcoat composition, which comprises a composition comprising catalytic particles (referred to as a catalyst-containing washcoat composition, a catalytically active powder-containing washcoat composition, or a catalyst powder-containing washcoat composition) to form a corner-fill-coated/catalyst particle-coated substrate; and coating the resulting corner-fill-coated/catalyst layer-coated substrate with yet another subsequent washcoat composition which comprises zeolite particles in high concentration (referred to as a zeolite particle-containing washcoat composition), to form the fully-coated substrate, which is a corner-fill-coated/catalyst particle-coated/zeolite particle-coated substrate. Preferably, a drying process and a calcining process are performed between each coating step. This configuration is designated S-F-C-Z (substrate-corner fill layer-catalyst layer-zeolite layer).

At step 710, a first washcoat composition, a corner-fill washcoat composition, is applied to a substrate in order to coat the substrate with a first washcoat layer. Preferably, the substrate comprises, consists essentially of, or consists of cordierite and comprises a honeycomb structure. However, it is contemplated that the substrate can be formed from other materials and in other configurations as well, as discussed herein.

At step 720, a first drying process is performed on the substrate. Examples of such drying processes include, but are not limited to, a hot-drying process, or a flash drying process.

At step 730, a first calcining process is performed on the substrate. It is contemplated that the length and temperature of the calcination process can vary depending on the characteristics of the components in a particular embodiment.

At step 740, a second washcoat composition, a catalyst-containing washcoat composition, is applied to the substrate in order to coat the first washcoat layer with a second washcoat layer.

At step 750, a second drying process is performed on the substrate. Examples of such drying processes include, but are not limited to, a hot-drying process, or a flash drying process.

At step 760, a second calcining process is performed on the substrate. It is contemplated that the length and temperature of the calcination process can vary depending on the characteristics of the components in a particular embodiment.

At step 770, a third washcoat composition, a zeolite particle-containing washcoat composition, is applied to the substrate in order to coat the second washcoat layer with a third washcoat layer.

At step 780, a third drying process is performed on the substrate. Examples of such drying processes include, but are not limited to, a hot-drying process, or a flash drying process.

At step 790, a third calcining process is performed on the substrate. It is contemplated that the length and temperature of the calcination process can vary depending on the characteristics of the components in a particular embodiment.

After the third calcining process, the coated substrate comprises a first layer, a second layer, and a third layer on its surface. The first layer, disposed over the substrate, contains corner-fill material such as aluminum oxide. The second layer, disposed over the first layer, comprises catalytic material. The third layer, disposed over the second layer, comprises a high concentration of zeolite. This method illustrates the production of the Substrate-Corner Fill-Catalytic Powder-Zeolite Particles configuration (S-F-C-Z) without additional washcoat layers; the method can be readily modified to apply additional washcoat layers as desired, before or after any step illustrated.

FIGS. 8A-D illustrate the production of a coated substrate at different stages of a washcoat coating method in accordance with some embodiments.

Figure 8A:
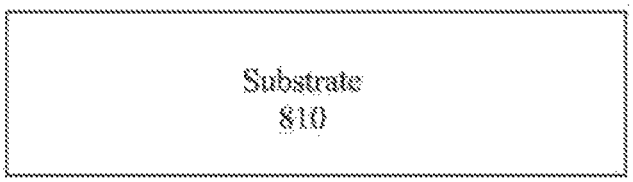
FIGS. 8A-D illustrate formation of a coated substrate at different stages of a washcoat coating method in accordance with some embodiments of the present invention.

FIG. 8A illustrates a substrate 810 prior to being coated with the first washcoat composition. Preferably, the substrate 810 comprises, consists essentially of, or consists of cordierite and comprises a honeycomb structure. However, it is contemplated that other configurations of the substrate 810 may also be used. It should be noted that the depiction of substrate 810 in FIGS. 8A-D illustrates only a portion of the surface being coated, and thus the subsequent washcoat layers illustrated as being coated onto this portion of the substrate are shown as only coating the top surface of the portion of the substrate. If the depiction of the substrate 810 in FIGS. 8A-D had been meant to illustrate the entire substrate, the washcoat layers would be shown as coating the entire surface of the substrate, and not just the top surface, as is depicted in FIGS. 8A-D for the portion of the substrate shown.

Figure 8B:
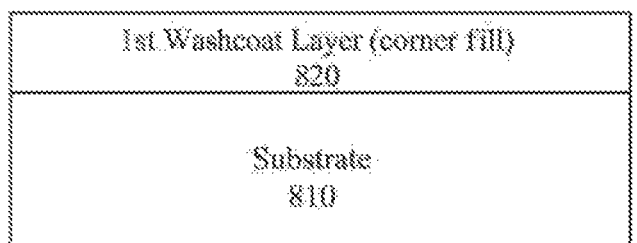

FIG. 8B illustrates the substrate 810 after its surface has been coated with a corner-fill washcoat composition, as discussed in the process depicted in FIG. 7. The first washcoat composition containing corner fill material can be applied, dried, and calcined. A resulting first washcoat layer 820 is formed on the surface of the substrate 810. This first washcoat layer 820 comprises corner fill material, such as aluminum oxide.

Figure 8C:
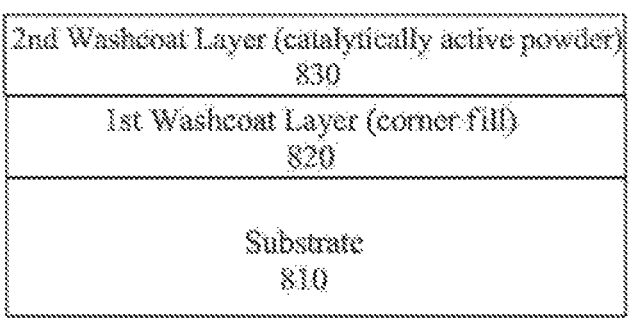

FIG. 8C illustrates the substrate 810 after the first washcoat layer 820 has been coated with a second washcoat composition, as discussed in the process depicted in FIG. 7. The second washcoat composition containing catalytic powder can be applied, dried, and calcined. As a result, a second washcoat layer 830 is formed over the first washcoat layer 820. This second washcoat layer 830 comprises catalytic powder.

Figure 8D:
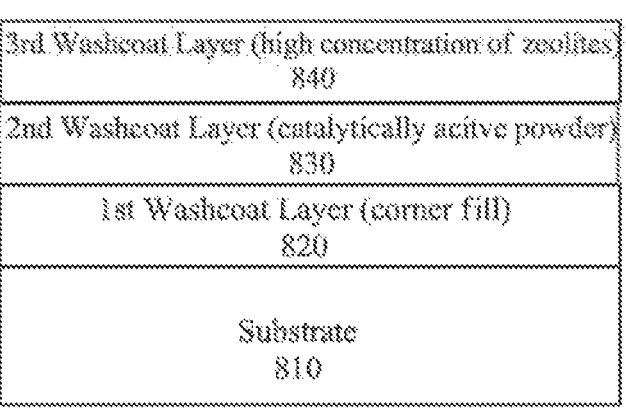

FIG. 8D illustrates the substrate 810 after the second washcoat layer 830 has been coated with a third washcoat composition, as discussed in the process depicted in FIG. 7. The third composition containing zeolite particles can be applied, dried, and calcined. As a result, a third washcoat layer 840 is formed over the second washcoat layer 830. This third washcoat layer 840 comprises zeolite particles, preferably in a high concentration. This coated substrate is in the Substrate-Corner Fill-Catalytic Powder-Zeolite Particles configuration (S-F-C-Z) without additional washcoat layers; additional washcoat layers can be included as desired, under, over, or between any layers illustrated.

While not illustrated, the invention also comprises a method of forming a coated substrate in accordance with the S-F-Z-C (substrate-corner fill layer-zeolite layer-catalyst layer) embodiment. The method comprises coating a substrate with a washcoat composition which comprises a corner-fill washcoat composition comprising alumina; coating the resulting corner-fill-coated substrate with a subsequent washcoat composition, which comprises a composition comprising zeolite particles (referred to as a zeolite particle-containing washcoat composition) to form a corner-fill-coated/zeolite particle-coated substrate; and coating the resulting corner-fill-coated/zeolite layer-coated substrate with yet another subsequent washcoat composition which comprises catalyst particles (referred to as a catalyst-containing washcoat composition, a catalytically active powder-containing washcoat composition, or a catalyst powder-containing washcoat composition), to form the fully-coated substrate, which is a corner-fill-coated/zeolite particle-coated/catalyst particle-coated substrate. Preferably, a drying process and a calcining process are performed between each coating step. This configuration is designated S-F-Z-C (substrate-corner fill layer-zeolite layer-catalyst layer).

Figure 9:
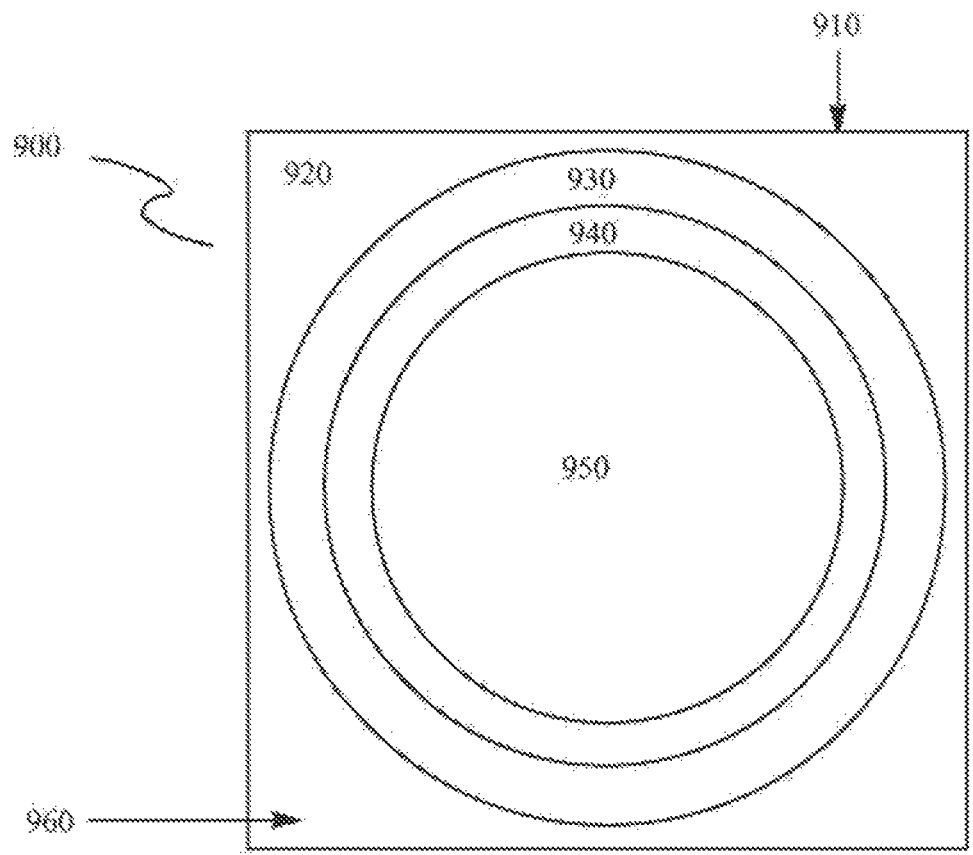
FIG. 9 shows a single rectangular channel in a coated substrate prepared according to one embodiment of the present invention.

FIG. 9 shows a single rectangular channel 900 in a coated substrate coated in the S-F-C-Z configuration, without additional washcoat layers. The wall 910 of the substrate channel has been coated with corner-fill washcoat layer 920, then catalyst-containing washcoat layer 930, then zeolite particle-containing washcoat layer 940. Exhaust gases pass through the lumen 950 of the channel when the coated substrate is employed in a catalytic converter as part of an emissions control system.

Exhaust Systems, Vehicles, and Emissions Performance

In some embodiments of the invention, a coated substrate as disclosed herein is housed within a catalytic converter in a position configured to receive exhaust gas from an internal combustion engine, such as in an exhaust system of an internal combustion engine. The catalytic converter can be used with the exhaust from a diesel engine, such as a light-duty diesel engine. The catalytic converter can be installed on a vehicle containing a diesel engine, such as a light-duty diesel engine.

The coated substrate is placed into a housing, such as that shown in FIG. 1, which can in turn be placed into an exhaust system (also referred to as an exhaust treatment system) of an internal combustion engine. The internal combustion engine can be a diesel engine, such as a light-duty diesel engine, such as the engine of a light-duty diesel vehicle. The exhaust system of the internal combustion engine receives exhaust gases from the engine, typically into an exhaust manifold, and delivers the exhaust gases to an exhaust treatment system. The catalytic converter forms part of the exhaust system and is often referred to as the diesel oxidation catalyst (DOC). The exhaust system can also include a diesel particulate filter (DPF) and/or a selective catalytic reduction unit (SCR unit) and/or a lean $NO_x$ trap (LNT); typical arrangements, in the sequence that exhaust gases are received from the engine, are DOC-DPF and DOC-DPF-SCR. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a diesel engine, such as a light-duty diesel engine, refers to having the exhaust gas proceed through an exhaust system (exhaust treatment system) prior to release into the environment. As noted above, typically the exhaust gas from the engine will flow through an exhaust system comprising a diesel oxidation catalyst and a diesel particulate filter, or an exhaust system comprising a diesel oxidation catalyst, a diesel particulate filter, and selective catalytic reduction unit (SCR), prior to release into the environment.

The United States Environmental Protection Agency defines a "light-duty diesel vehicle" ("LDDV") as a diesel-powered motor vehicle, other than a diesel bus, that has a gross vehicle weight rating of 8,500 pounds or less and is designed primarily for transporting persons or property. In Europe, a "light-duty diesel engine" has been considered to be an engine used in a vehicle of 3.5 metric tons or less (7,716 pounds or less) (see European directives 1992/21 EC and 1995/48 EC). In some embodiments of the invention, a light-duty diesel vehicle is a diesel vehicle weighing about 8,500 pounds or less, or about 7,700 pounds or less, and a light-duty diesel engine is an engine used in a light-duty diesel vehicle.

When used in a catalytic converter, the coated substrates disclosed herein may provide a significant improvement over other catalytic converters. The zeolites in the coated substrate act as an intermediate storage device for the exhaust gases while the exhaust gas is still cold. The undesirable gases (including, but not limited to, hydrocarbons, carbon monoxide, and nitrogen oxides or $NO_x$) adsorb to the zeolites during the cold start phase, while the catalyst is not yet active, and are released later when the catalyst reaches a temperature sufficient to effectively decompose the gases (that is, the light-off temperature).

In some embodiments, catalytic converters and exhaust treatment systems employing the coated substrates disclosed herein display emissions of 3400 mg/mile or less of CO emissions and 400 mg/mile or less of $NO_x$ emissions; 3400 mg/mile or less of CO emissions and 200 mg/mile or less of $NO_x$ emissions; or 1700 mg/mile or less of CO emissions and 200 mg/mile or less of $NO_x$ emissions. The disclosed coated substrates, used as catalytic converter substrates, can be used in an emission system to meet or exceed these standards. In some embodiments, the coated substrate is used in a catalytic converter (diesel oxidation catalyst) in the configuration DOC-DPF or DOC-DPF-SCR to meet or exceed these standards.

Emissions limits for Europe are summarized at the URL europa.eu/legislation_summaries/environment/air_pollution/128186_en.htm. The Euro 5 emissions standards, in force as of September 2009, specify a limit of 500 mg/km of CO emissions, 180 mg/km of $NO_x$ emissions, and 230 mg/km of HC (hydrocarbon)+$NO_x$ emissions. The Euro 6 emissions standards, scheduled for implementation as of September 2014, specify a limit of 500 mg/km of CO emissions, 80 mg/km of $NO_x$ emissions, and 170 mg/km of HC (hydrocarbon)+$NO_x$ emissions. The disclosed catalytic converter substrates can be used in an emission system to meet or exceed these standards. In some embodiments, the coated substrate is used in a catalytic converter (diesel oxidation catalyst) in the configuration DOC-DPF or DOC-DPF-SCR to meet or exceed these standards.

In some embodiments, a catalytic converter made with a coated substrate of the invention, loaded with 5.0 g/l of PGM or less, displays a carbon monoxide light-off temperature at least 5 degrees C. lower than a catalytic converter made with wet chemistry methods and having the same or similar PGM loading. In some embodiments, a catalytic converter made with a coated substrate of the invention, loaded with 5.0 g/l of PGM or less, displays a carbon monoxide light-off temperature at least 10 degrees C. lower than a catalytic converter made with wet chemistry methods and having the same or similar PGM loading. In some embodiments, a catalytic converter made with a coated substrate of the invention, loaded with 4.0 g/l of PGM or less, displays a carbon monoxide light-off temperature at least 5 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−3 degrees C. of the carbon monoxide light-off temperature of a catalytic converter made with wet chemistry methods, while the catalytic converter made with a coated substrate employing 30% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made with wet chemistry methods, while the catalytic converter made with a coated substrate employing 30% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−4 degrees C. of the carbon monoxide light-off temperature of a catalytic converter made with wet chemistry methods, while the catalytic converter made with a coated substrate employing 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made with wet chemistry methods, while the catalytic converter made with a coated substrate employing 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−5 degrees C. of the carbon monoxide light-off temperature of a catalytic converter made with wet chemistry methods, while the catalytic converter made with a coated substrate of the invention employing 50% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made with wet chemistry methods, while the catalytic converter made with a coated substrate of the invention employing 50% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with United States EPA emissions requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with the same standard. In some embodiments, the coated substrate is used in a catalytic converter (diesel oxidation catalyst) in the configuration DOC-DPF or DOC-DPF-SCR to meet or exceed these standards. The emissions requirements can be intermediate life requirements or full life requirements. The requirements can be TLEV requirements, LEV requirements, or ULEV requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with EPA TLEV/LEV intermediate life requirements. In some embodiments, a catalytic converter made with a coated substrate of the invention employed on a diesel engine or diesel vehicle, such as a light-duty diesel engine or light-duty diesel vehicle, complies with EPA TLEV/LEV full life requirements. In some embodiments, a catalytic converter made with a coated substrate of the invention employed on a diesel engine or diesel vehicle, such as a light-duty diesel engine or light-duty diesel vehicle, complies with EPA ULEV intermediate life requirements. In some embodiments, a catalytic converter made with a coated substrate of the invention employed on a diesel engine or diesel vehicle, such as a light-duty diesel engine or light-duty diesel vehicle, complies with EPA ULEV full life requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine or diesel vehicle, such as a light-duty diesel engine or light-duty diesel vehicle, complies with EPA TLEV/LEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA TLEV/LEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA ULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a diesel engine or diesel vehicle, such as a light-duty diesel engine or light-duty diesel vehicle, complies with EPA ULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with Euro 5 requirements. In some embodiments, a catalytic converter made with a coated substrate of the invention employed on a diesel engine or diesel vehicle, such as a light-duty diesel engine or light-duty diesel vehicle, complies with Euro 6 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a diesel engine or diesel vehicle, such as a light-duty diesel engine or light-duty diesel vehicle, complies with Euro 5 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 5 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 6 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a light-duty diesel engine or light-duty diesel vehicle, displays carbon monoxide emissions of 4200 mg/mile or less. In some embodiments, a catalytic converter made with a coated substrate of the invention and employed on a diesel engine or diesel vehicle, such as a light-duty diesel engine or light-duty diesel vehicle, displays carbon monoxide emissions of 3400 mg/mile or less. In some embodiments, a catalytic converter made with a coated substrate of the invention and employed on a diesel engine or diesel vehicle, such as a light-duty diesel engine or light-duty diesel vehicle, displays carbon monoxide emissions of 2100 mg/mile or less. In another embodiment, a catalytic converter made with a coated substrate of the invention and employed on a diesel engine or diesel vehicle, such as a light-duty diesel engine or light-duty diesel vehicle, displays carbon monoxide emissions of 1700 mg/mile or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays carbon monoxide emissions of 500 mg/km or less. In some embodiments, a catalytic converter made with a coated substrate of the invention and employed on a diesel engine or diesel vehicle, such as a light-duty diesel engine or light-duty diesel vehicle, displays carbon monoxide emissions of 375 mg/km or less. In some embodiments, a catalytic converter made with a coated substrate of the invention and employed on a diesel engine or diesel vehicle, such as a light-duty diesel engine or light-duty diesel vehicle, displays carbon monoxide emissions of 250 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays $NO_x$ emissions of 180 mg/km or less. In some embodiments, a catalytic converter made with a coated substrate of the invention and employed on a diesel engine or diesel vehicle, such as a light-duty diesel engine or light-duty diesel vehicle, displays $NO_x$ emissions of 80 mg/km or less. In some embodiments, a catalytic converter made with a coated substrate of the invention and employed on a diesel engine or diesel vehicle, such as a light-duty diesel engine or light-duty diesel vehicle, displays $NO_x$ emissions of 40 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays $NO_x$ plus HC emissions of 230 mg/km or less. In some embodiments, a catalytic converter made with a coated substrate of the invention and employed on a diesel engine or diesel vehicle, such as a light-duty diesel engine or light-duty diesel vehicle, displays $NO_x$ plus HC emissions of 170 mg/km or less. In some embodiments, a catalytic converter made with a coated substrate of the invention and employed on a diesel engine or diesel vehicle, such as a light-duty diesel engine or light-duty diesel vehicle, displays $NO_x$ plus HC emissions of 85 mg/km or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a diesel engine or diesel vehicle, such as a light-duty diesel engine or light-duty diesel vehicle, displays carbon monoxide emissions of 500 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays carbon monoxide emissions of 375 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays carbon monoxide emissions of 250 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a diesel engine or diesel vehicle, such as a light-duty diesel engine or light-duty diesel vehicle, displays $NO_x$ emissions of 180 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ emissions of 80 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ emissions of 40 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a diesel engine or diesel vehicle, such as a light-duty diesel engine or light-duty diesel vehicle, displays $NO_x$ plus HC emissions of 230 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ plus HC emissions of 170 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a diesel engine or diesel vehicle, such as a light-duty diesel engine or light-duty diesel vehicle, displays $NO_x$ plus HC emissions of 85 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a diesel engine or vehicle, such as a light-duty diesel engine or light-duty diesel vehicle), or 2) a catalytic converter made with wet chemistry, which uses the minimal amount of platinum group metal to achieve the performance standard indicated.

In some embodiments, for the above-described comparisons, both the coated substrate according to the invention, and the catalyst used in the commercially available catalytic converter or the catalyst prepared using wet chemistry methods, are aged (by the same amount) prior to testing. In some embodiments, both the coated substrate according to the invention, and the catalyst substrate used in the commercially available catalytic converter or the catalyst substrate prepared using wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the invention, and the catalyst substrate used in the commercially available catalytic converter or the catalyst substrate prepared using wet chemistry methods, are artificially aged (by the same amount) prior to testing. In some embodiments, they are artificially aged by heating to about 400° C., about 500° C., about 600° C., about 700°, about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours. In some embodiments, they are artificially aged by heating to about 800° C. for about 16 hours.

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a diesel engine or vehicle, such as a light-duty diesel engine or light-duty diesel vehicle), or 2) a catalytic converter made with wet chemistry, which uses the minimal amount of platinum group metal to achieve the performance standard indicated, and after the coated substrate according to the invention and the catalytic substrate used in the commercially available catalyst or catalyst made using wet chemistry with the minimal amount of PGM to achieve the performance standard indicated are aged as described above.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_x$, and/or HC described above.

EXAMPLES

As discussed above, the washcoat compositions can be configured and applied in a variety of different ways. The configurations provide examples of preparing substrates coated with the washcoats.

General Procedure for Preparation of Washcoats

The washcoats are made by mixing the solid ingredients (about 30% by weight) with water (about 70% by weight). Acetic acid is added to adjust the pH to about 4. The washcoat slurry is then milled to arrive at an average particle size of about 4 µm to about 6 µm. The viscosity of the washcoat is adjusted by mixing with a cellulose solution or with corn starch to the desired viscosity, typically between about 300 cP to about 1200 cP. The washcoat is aged for about 24 hours to about 48 hours after cellulose or corn starch addition. The washcoat is coated onto the substrate by either dip-coating or vacuum coating. The part(s) to be coated can be optionally pre-wetted prior to coating. The washcoat amount coated onto the substrate can range from about 50 g/l to about 250 g/l. Excess washcoat is blown off and recycled. The washcoat-coated substrate is then dried at about 25° C. to about 95° C. by flowing air over the coated part, until the weight levels off. The washcoat-coated substrate is then calcined at about 450° C. to about 650° C. for about 1 hour to about 2 hours.

In one of these configurations, a first washcoat composition applied to a substrate comprises 3% (or approximately 3%) boehmite, 80% (or approximately 80%) zeolites, and 17% (or approximately 17%) porous alumina (e.g., MI-386 or the like), while a second washcoat composition comprises 3% (or approximately 3%) boehmite, 5% (or approximately 5%) silica (or, in another embodiment, instead of silica, 5% zeolites or approximately 5% zeolites), and 92% (or approximately 92%) catalytic powder (i.e., the powder containing the catalytic material), wherein the catalytic powder is NNm Powder (catalytic nano-particle on support nano-particle on support micro-particle).

The ingredients discussed above for the first washcoat composition are mixed with water and acid, such as acetic acid, and the pH is adjusted to about 4. After adjusting the viscosity to the proper levels, this first washcoat gets coated onto the substrate with an approximate layer thickness of 70 g/l.

This first washcoat layer is then dried and calcined. Following this first washcoating step, a second washcoating step is applied, where the ingredients discussed above for the second washcoat composition are mixed with water and acid, such as acetic acid, and the pH is adjusted to about 4. After adjusting the viscosity to the proper levels, this second washcoat gets coated onto the substrate with an approximate layer thickness of 120 g/l. This second washcoat layer is then dried and calcined.

Example 1

Substrate-Zeolite Particles-Catalytic Powder Configuration, or S-Z-C, Configuration: No Zeolites in Catalyst-Containing Washcoat (a) First Washcoat Composition: Approx. 70 g/l as follows:
 3% Boehmite
 80% Zeolites
 17% Porous alumina (MI-386 or the like)
(b) Second Washcoat Composition: Approx. 120 g/l as follows:
 3% Boehmite;
 5% Silica;
 92% NNm Powder (nano-particle on nano-particle on micro-particle), the powder that contains the PGM, i.e. the platinum group metals or precious metals.

Mix the washcoat ingredients from (a) with water and acetic acid and to adjust the pH to about 4. After adjusting the viscosity to the proper levels, the washcoat gets coated onto the substrate with an approximate layer thickness of 70 g/l. Excess washcoat is blown off and recycled. This first washcoat layer is then dried and calcined. Following this first washcoating step, a second washcoating step is performed: the ingredients from (b) are mixed with water and acetic acid and the pH adjusted to about 4. After adjusting the viscosity to the proper levels the washcoat gets coated onto the substrate with an approximate layer thickness of 120 g/l. Again, excess washcoat is blown off and recycled. This second washcoat layer is then dried and calcined.

Example 2

Substrate-Zeolite Particles-Catalytic Powder Configuration, or S-Z-C, Configuration: Zeolites Present in Catalyst-Containing Washcoat (a) First Washcoat Composition: Approx. 70 g/l as follows:
 3% Boehmite
 80% Zeolites
 17% Porous alumina (MI-386 or the like)
(b) Second Washcoat Composition: Approx. 120 g/l as follows:
 3% Boehmite;
 5% Zeolites;
 92% NNm Powder (catalytic nano-particle on support nano-particle on support micro-particle), the powder that contains the PGM, i.e. the platinum group metals or precious metals.

The same procedure described in Example 1 is used to coat the substrate in this example.

Example 3

Additional Example of Substrate-Zeolite Particles-Catalytic Powder, or S-Z-C, Configuration (a) First Washcoat Composition: 25 g/l to 90 g/l (approximately. 60 g/l or approximately 70 g/l preferred) as follows:
 2-5% Boehmite (about 3% preferred);
 60-80% Zeolites, such as 75-80% Zeolites (about 80% preferred);
 15-38% Porous alumina (MI-386 or the like), such as 15-22% Porous alumina (about 17% to about 22% preferred).
(b) Second Washcoat Composition: 50 g/l to 250 g/l (approximately 120 g/l preferred) as follows:
 2-5% Boehmite (about 3% preferred);
 0-20% Silica (about 5% preferred);
 40-92% catalytically active powder (about 92% preferred); and
 0-52% porous alumina (about 0% preferred).

The same procedure described in Example 1 is used to coat the substrate in this example. In another embodiment, 0-20% Zeolites are used instead of the 0-20% Silica (with about 5% being the preferred amount of Zeolite used).

Example 4

Substrate-Corner Fill-Catalytic Particle-Zeolite, or S-F-C-Z, Configuration

In another advantageous configuration, a first washcoat composition applied to the substrate is a corner-fill washcoat applied to the substrate. The solids content of the corner-fill washcoat comprises about 97% by weight porous alumina (MI-386) and about 3% by weight boehmite. Water and acetic acid are added to the corner fill washcoat, the pH is adjusted to about 4, and viscosity is adjusted. The corner-fill washcoat composition is applied to the substrate, excess washcoat is blown off and recycled, and the washcoat is dried and calcined. The zeolite-containing washcoat composition and the catalyst-containing washcoat composition illustrated in the foregoing examples can also be used in this example. Thus, a second washcoat composition is applied over the corner-fill washcoat layer, which comprises 3% (or approximately 3%) boehmite, 5% (or approximately 5%) silica, and 92% (or approximately 92%) catalytic powder (i.e., the powder containing the catalytic material). Excess catalyst-containing washcoat is blown off and recycled. After application, the catalyst-containing washcoat composition is dried and calcined. A third washcoat composition, applied over the catalyst-containing washcoat layer, comprises 3% (or approximately 3%) boehmite, 67% (or approximately 67%) zeolites, and 30% (or approximately 30%) porous alumina (e.g., MI-386 or the like). After application, excess zeolite particle-containing washcoat is blown off and recycled, and the zeolite particle-containing washcoat composition is dried and calcined.

Figure 4:
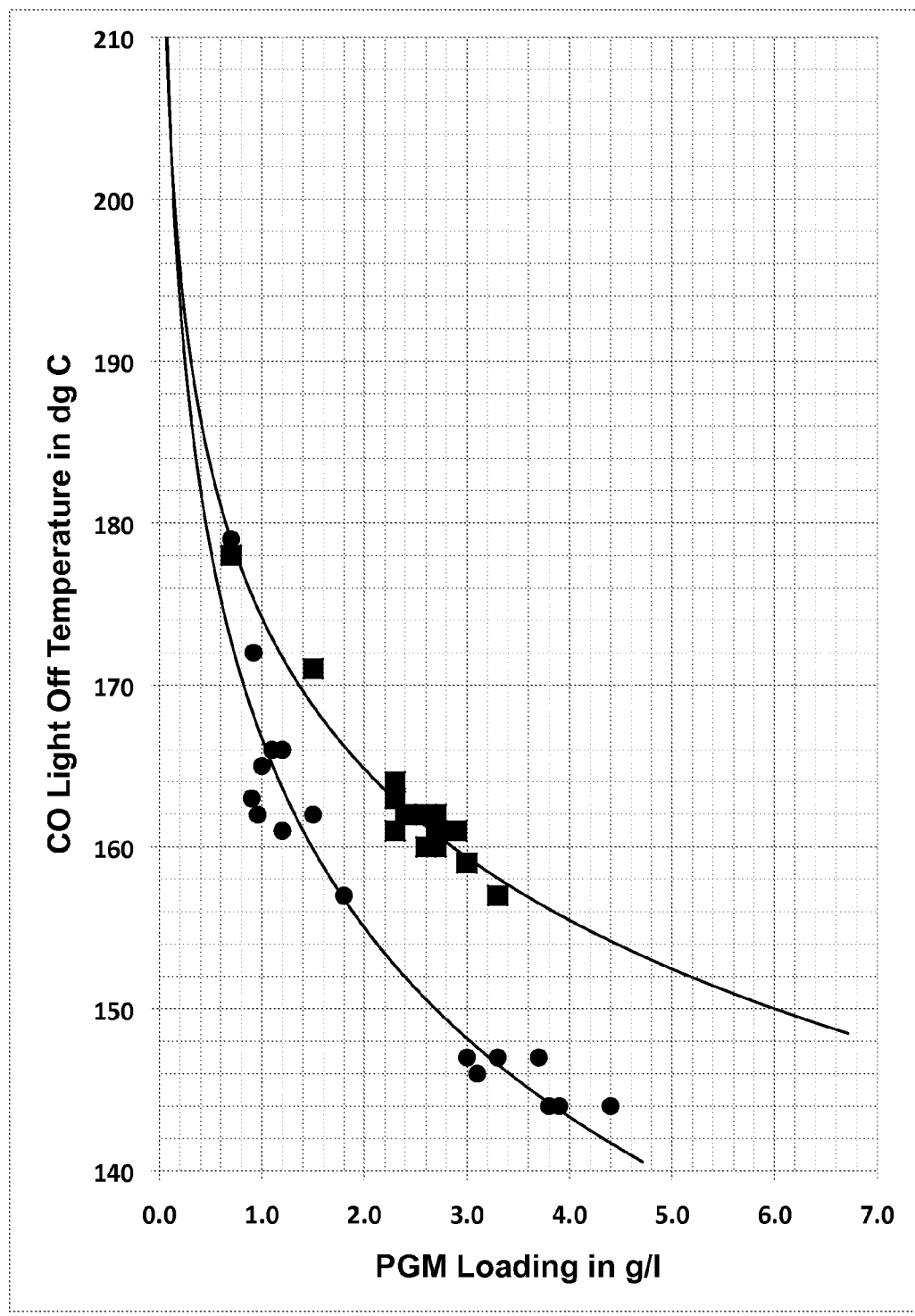
FIG. 4 compares the performance of one embodiment of the present invention (filled circles) to a combined washcoat (filled squares).

FIG. 4 illustrates the performance of a coated substrate prepared according to one embodiment, compared to the configuration used in nanoparticulate coated substrates prepared with a washcoat where the zeolites are not separated from the catalytic particles. All test results described below utilize catalysts which were artificially aged at 800° C. for 16 hours to simulate operation after 125,000 miles in a car.

The filled circles ● and the curve fit to those data points represent the following coating scheme:
a) A first layer which is a corner fill washcoat, followed by
b) A second layer which is a PGM washcoat using nano-on-nano-on-micron catalyst, containing 5% zeolites (that is, very low zeolite concentration). The PGM is 2:1 Pt/Pd.

For the simulation, this second layer may or may not be followed by a zeolite particle-containing washcoat layer. In actual practice, a zeolite particle-containing washcoat composition will be applied either under the PGM layer (that is, applied, dried, and calcined to the substrate prior to applying the PGM washcoat) or above the PGM layer (that is, applied, dried, and calcined to the substrate after applying the PGM washcoat).

The filled squares ■ and the line fit to those data points represent the following coating scheme:
a) A first layer which is a corner fill washcoat, followed by
b) A second layer which is a PGM washcoat, containing the entire zeolite amount (that is, all of the zeolites of the zeolite-containing washcoat layer are combined with the nano-on-nano-on-micron catalytic powder-containing layer). The PGM is 2:1 Pt/Pd.

The simulation is performed under steady-state conditions for experimental purposes (in actual operation, cold-start conditions are not steady-state). A carrier gas containing carbon monoxide, $NO_x$, and hydrocarbons is passed over the coated substrates, in order to simulate diesel exhaust. The temperature of the substrate is gradually raised until the light-off temperature is achieved (that is, when the coated substrate reaches a temperature sufficient to convert CO into $CO_2$).

As is evident from the graph, when compared to the coated substrate prepared with a combined washcoat of zeolite and PGM, the coated substrate prepared according to the present invention demonstrated either a lower light-off temperature for carbon monoxide at the same loading of platinum group metal (i.e., the coated substrate as described herein demonstrates better performance as compared to the coated substrate with a combined zeolite-PGM washcoat, while using the same amount of PGM), or required a lower loading of platinum group metal at the same light-off temperature (i.e., to obtain the same performance with the coated substrate described herein as compared to the coated substrate with a combined zeolite-PGM washcoat, less of the expensive PGM was required for the coated substrates described herein).

Specifically, the lowest light-off temperature attained with the combined zeolite-PGM washcoat was 157° C. at 3.3 g/l platinum group metal loading, while a coated substrate prepared according as described herein (using a catalytic layer with a low zeolite content) and with the same 3.3 g/l PGM loading had a light-off temperature of 147° C., a reduction in light-off temperature of 10° C. Thus, the low zeolite-containing washcoated substrate demonstrated superior performance at the same PGM loading.

The lowest light-off temperature of 157° C. was attained with the coated substrate having a combined zeolite-PGM washcoat at 3.3 g/l platinum group metal loading. A light-off temperature of 157° C. was attained with the coated substrate having the low zeolite-containing washcoat at a platinum group metal loading of 1.8 g/l, a reduction in platinum group metal loading of 1.5 g/l or 45%. Thus, the coated substrate with the low zeolite-containing washcoat demonstrated identical performance, at a significantly reduced PGM loading, to the coated substrate with the combined zeolite-PGM washcoat.

Figure 10:
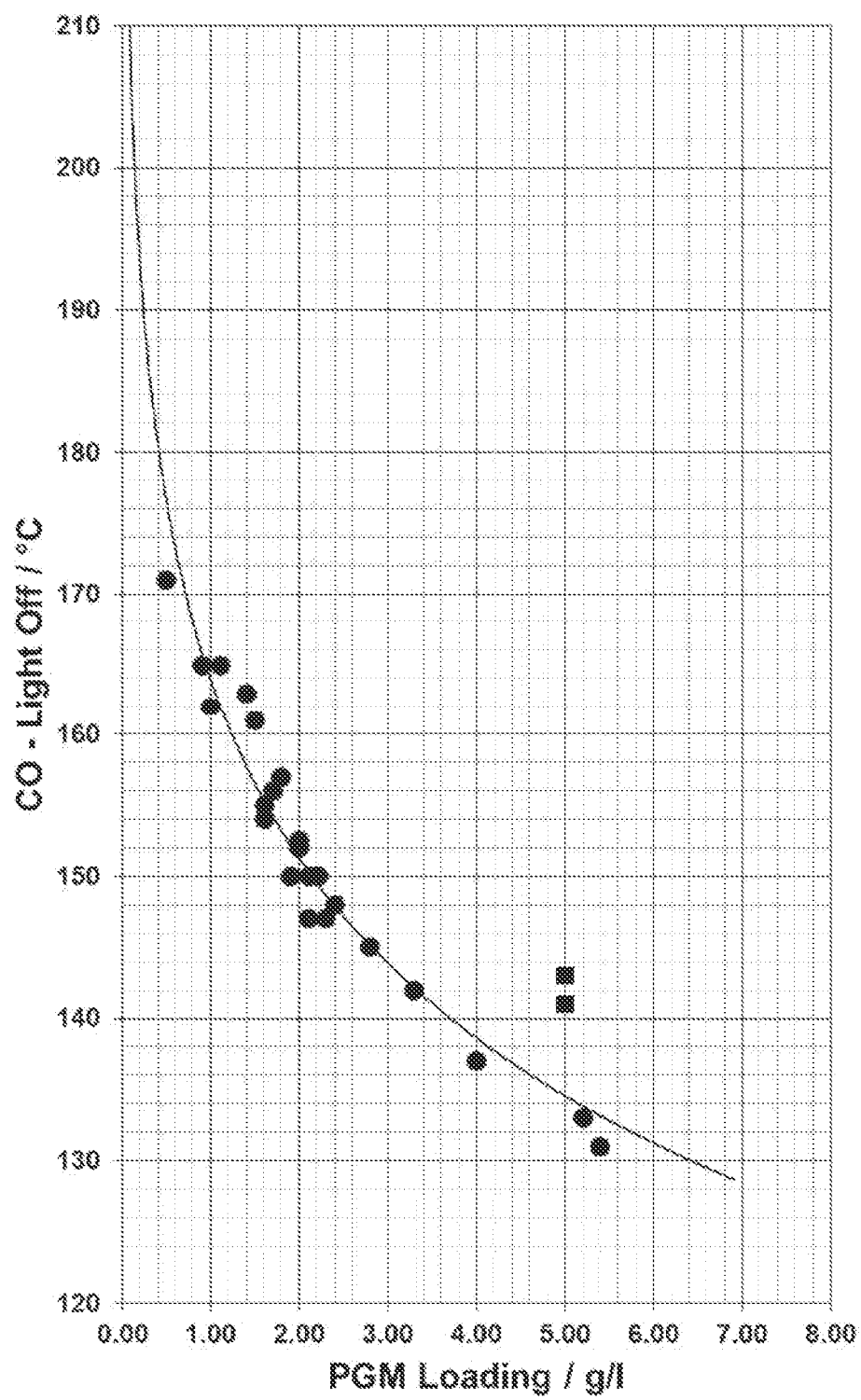
FIG. 10 compares the performance of one embodiment of the present invention (filled circles) to a standard commercially available catalytic converter (filled squares).

Comparison of Catalytic Converter Performance Described Herein to Commercially Available Catalytic Converters A. Improvement in Light-Off Temperatures FIG. 10 illustrates the performance of a coated substrate in a catalytic converter, where the coated substrate is prepared according to one embodiment of the present invention, compared to a commercially available catalytic converter having a substrate prepared using wet-chemistry methods. The coated substrates are artificially aged and tested in a similar fashion as that indicated in the section above in the description of FIG. 4 results.

The filled circles represent data points for the carbon monoxide light-off temperatures for the coated substrate prepared with a washcoat having nano-on-nano-on-micron (NNm) catalyst (where the PGM is 2:1 Pt:Pd). The filled squares indicate the CO light-off temperatures for a commercially available coated substrate prepared by wet-chemistry methods (also with a 2:1 Pt:Pd ratio).

The commercially available coated substrate displays CO light-off temperatures of 141° C. and 143° C. at a PGM loading of 5.00 g/l (for an average of 142° C.). The coated substrate with the NNm washcoat displays CO light-off temperatures of 133° C. at 5.1 g/l PGM loading and 131° C. at 5.2 g/l PGM loading, or about 8 to about 10 degrees C. lower than the commercially available coated substrate at similar PGM loading. The coated substrate with the NNm washcoat displays a CO light-off temperature of 142° C. at a PGM loading of 3.3 g/l, for similar light-off performance to the commercially available coated substrate, but at a thrifting (reduction) of PGM loading of 34%.

B. Improvement in Emissions Profile in Vehicle

Figure 11:
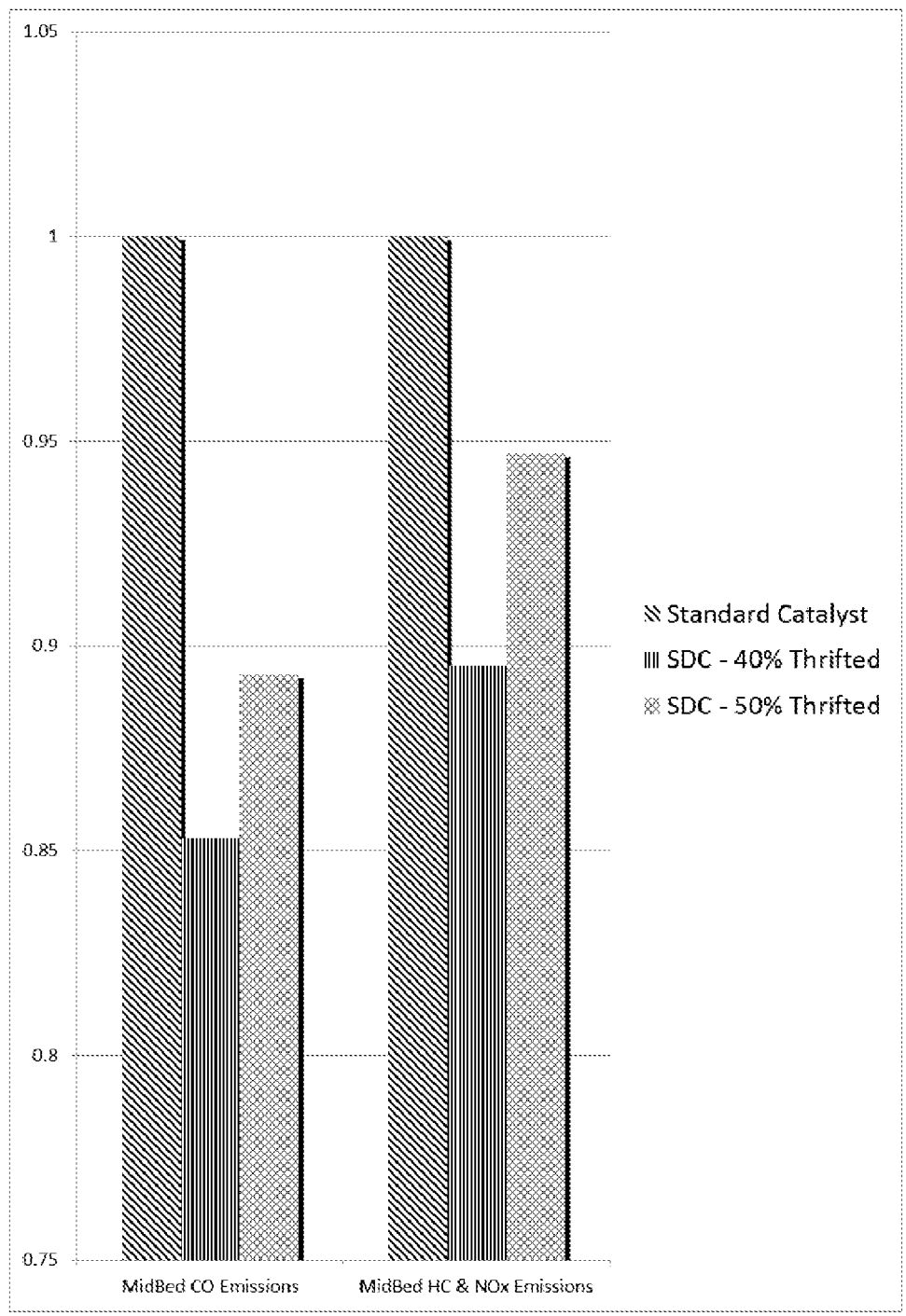
FIG. 11 shows a comparison of midbed catalytic converter gases of certain embodiments of the present invention versus a standard commercially available catalytic converter.

FIG. 11 illustrates the performance of a coated substrate prepared according to some embodiments of the present invention installed in a catalytic converter and used as a diesel oxidation catalyst, compared to a commercially available catalytic converter prepared using wet-chemistry methods. These measurements were made on an actual diesel engine vehicle, mounted on rollers and driven robotically for testing. The exhaust from the engine passes through the diesel oxidation catalyst (DOC), and sensors measure the emissions profile after the exhaust passes through the DOC. (The emissions then pass through a diesel particulate filter (DPF) prior to release into the environment.) The DOCs tested were artificially aged at 800° C. for 16 hours to simulate operation after 125,000 miles in a car.

The midbed emissions profile of the exhaust, after passing through the DOC and before entering the DPF, are shown in FIG. 11. Midbed emissions of carbon monoxide are shown in the left group of bars, while midbed emissions of hydrocarbons and nitrogen oxides are shown in the right group of bars. The emissions profile after passing through a commercially available diesel oxidation catalyst (DOC) is shown in the left bar of each group, and are normalized to 1.0. The emissions profile of a DOC using a catalytic converter prepared according to the methods described herein are illustrated by the center and right bars of each group. The center bars of each group are for a catalytic converter prepared according to the invention which are 40% thrifted (that is, containing 40% less PGM than the commercially available catalytic converter), while the right bars of each group are for a catalytic converter prepared according to the invention which are 50% thrifted (that is, containing 50% less PGM than the commercially available catalytic converter). The 40% thrifted converters of the invention showed 85.3% of the CO emissions and 89.5% of the $HC/NO_x$ emissions as the commercially available catalyst. The 50% thrifted converters of the invention showed 89.3% of the CO emissions and 94.7% of the $HC/NO_x$ emissions as the commercially available catalyst. Thus, catalytic converters prepared with coated substrates according to the invention demonstrated superior emissions performance over commercially available wet-chemistry catalysts, while using significantly less PGM.

The disclosures of all publications, patents, patent applications and published patent applications referred to herein by an identifying citation are hereby incorporated herein by reference in their entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiments chosen for illustration without departing from the spirit and scope of the invention. Therefore, the description and examples should not be construed as limiting the scope of the invention.

What is claimed is:

1. A coated substrate comprising:
a substrate;
a washcoat layer comprising zeolite particles; and
a washcoat layer comprising catalytically active particles;
wherein the catalytically active particles comprise plasma synthesized composite nano-particles bonded to micron-sized carrier particles, and the composite nano-particles comprise a support nano-particle and a catalytic nano-particle, the catalytic nano-particle comprising at least one platinum group metal.

2. The coated substrate of claim 1, wherein the washcoat layer comprising zeolite particles is formed on top of the washcoat layer comprising catalytically active particles.

3. The coated substrate of claim 1, wherein the washcoat layer comprising catalytically active particles is formed on top of the washcoat layer comprising zeolite particles.

4. The coated substrate of claim 1, wherein the catalytic nano-particles comprise platinum and palladium.

5. The coated substrate of claim 4, wherein the catalytic nano-particles comprise platinum and palladium in a weight ratio of 2:1 platinum:palladium.

6. The coated substrate of claim 1, wherein the support nano-particles have an average diameter of 10 nm to 20 nm.

7. The coated substrate of claim 1, wherein the catalytic nano-particles have an average diameter of between 1 nm and 5 nm.

8. The coated substrate of claim 1, wherein the washcoat layer comprising zeolite particles comprises metal-oxide particles and boehmite particles.

9. The coated substrate of claim 8, wherein the metal-oxide particles are aluminum-oxide particles.

10. The coated substrate of claim 8, wherein the zeolite particles comprise 60% to 80% by weight of the mixture of zeolite particles, metal-oxide particles, and boehmite particles in the washcoat layer comprising zeolite particles.

11. The coated substrate of claim 8, wherein the boehmite particles comprise 2% to 5% by weight of the mixture of zeolite particles, metal-oxide particles, and boehmite particles in the washcoat layer comprising zeolite particles.

12. The coated substrate of claim 8, wherein the metal-oxide particles comprise 15% to 38% by weight of the mixture of zeolite particles, metal-oxide particles, and boehmite particles in the washcoat layer comprising zeolite particles.

13. The coated substrate of claim 1, wherein the washcoat layer comprising zeolite particles does not include platinum group metals.

14. The coated substrate of claim 1, wherein the zeolite particles in the washcoat layer comprising zeolite particles each have a diameter of 0.2 microns to 8 microns.

15. The coated substrate of claim 1, wherein the washcoat layer comprising catalytically active particles further comprises boehmite particles and silica particles.

16. The coated substrate of claim 15, wherein the catalytically active particles comprise 35% to 95% by weight of the combination of the catalytically active particles, boehmite particles, and silica particles in the washcoat layer comprising catalytically active particles.

17. The coated substrate of claim 15, wherein the silica particles are present in an amount up to 20% by weight of the combination of the catalytically active particles, boehmite particles, and silica particles in the washcoat layer comprising catalytically active particles.

18. The coated substrate of claim 15, wherein the boehmite particles comprise 2% to 5% by weight of the combination of the catalytically active particles, the boehmite particles, and the silica particles in the washcoat layer comprising catalytically active particles.

19. The coated substrate of claim 15, wherein the washcoat layer comprising catalytically active particles comprises 92% by weight of the catalytically active particles, 3% by weight of the boehmite particles, and 5% by weight of the silica particles.

20. The coated substrate of claim 1, wherein the washcoat layer comprising catalytically active particles is substantially free of zeolites.

21. The coated substrate of claim 1, wherein the substrate comprises cordierite.

22. The coated substrate of claim 1, wherein the substrate comprises a honeycomb structure.

23. The coated substrate of claim 1, wherein the washcoat layer comprising zeolite particles has a thickness of 25 g/l to 90 g/l.

24. The coated substrate of claim 1, wherein the washcoat layer comprising catalytically active particles has a thickness of 50 g/l to 250 g/l.

25. The coated substrate of claim 1, further comprising a corner-fill layer deposited directly on the substrate.

26. The coated substrate of claim 1, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

27. The coated substrate of claim 1, wherein the coated substrate has a platinum group metal loading of about 3.0 g/l to about 4.0 g/l.

28. The coated substrate of claim 1, said coated substrate having a platinum group metal loading of about 3.0 g/l to about 5.5 g/l, wherein after 125,000 miles of operation in a vehicular catalytic converter, the coated substrate has a light-off temperature for carbon monoxide at least 5 ° C. lower than a coated substrate prepared by depositing platinum group metals by wet chemical methods having the same platinum group metal loading after 125,000 miles of operation in a vehicular catalytic converter.

29. The coated substrate of claim 1, said coated substrate having a platinum group metal loading of about 3.0 g/l to about 5.5 g/l, wherein after aging for 16 hours at 800 ° C., the coated substrate has a light-off temperature for carbon monoxide at least 5 ° C. lower than a coated substrate prepared by depositing platinum group metals by wet chemical methods having the same platinum group metal loading after aging for 16 hours at 800 ° C.

30. A catalytic converter comprising a coated substrate according to claim 1.

31. An exhaust treatment system comprising a conduit for exhaust gas and a catalytic converter according to claim 30.

32. A diesel vehicle comprising a catalytic converter according to claim 31.

33. The diesel vehicle of claim 32, wherein said diesel vehicle is a light-duty diesel vehicle.

34. A method of treating an exhaust gas, comprising contacting the coated substrate of claim 1 with the exhaust gas.

35. A method of treating an exhaust gas, comprising contacting the coated substrate of claim 1 with the exhaust gas, wherein the substrate is housed within a catalytic converter configured to receive the exhaust gas.

36. A method of forming a coated substrate, the method comprising:
   a) coating a substrate with a washcoat composition comprising zeolite particles; and
   b) coating the substrate with a washcoat composition comprising catalytically active particles; and
   wherein the catalytically active particles comprises plasma synthesized composite nano-particles which are bonded to micron-sized carrier particles, said composite nano-particles comprising a support nano-particle and a catalytic nano-particle, the catalytic nano-particle comprising at least one platinum group metal.

37. The method of claim 36, wherein coating the substrate with the washcoat layer comprising zeolite particles is performed before coating the substrate with the washcoat layer comprising catalytically active particles.

38. The method of claim 36, wherein coating the substrate with the washcoat layer comprising catalytically active particles is performed before coating the substrate with the washcoat layer comprising zeolite particles.

39. The method of claim 36, further comprising coating the substrate with a corner-fill washcoat prior to both step a) and step b).

40. The method of claim 36, wherein the washcoat composition comprising zeolite particles comprises a thickness of 25 g/l to 90 g/l.

41. The method of claim 36, wherein the washcoat composition comprising catalytically active particles comprises a thickness of 50 g/l to 250 g/l.

42. A washcoat composition comprising a solids content of:
   35% to 95% by weight of catalytically active particles comprising plasma synthesized composite nano-particles bonded to micron-sized carrier particles, and the composite nano-particles comprise a support nano-particle and a catalytic nano-particle, the catalytic nano-particle comprising at least one platinum group metal; and
   2% to 55% by weight of metal-oxide particles.

43. The washcoat composition of claim 42, further comprising up to 20% by weight of silica particles.

44. The washcoat composition of claim 42, wherein the metal oxide particles are aluminum oxide particles.

45. The washcoat composition of claim 42, wherein the solids are suspended in an aqueous medium at a pH between 3 and 5.

46. The washcoat composition of claim 42, said washcoat composition being characterized by being substantially free of zeolites.

47. The washcoat composition of claim 42, wherein said catalytically active particles comprise 92% by weight of the solids content.

48. The washcoat composition of claim 42, wherein said at least one platinum group metal comprises platinum and palladium in a 2:1 Pt/Pd weight/weight ratio.

49. The washcoat composition of claim 42, further comprising 1% to 10% by weight of boehmite particles.

50. A method of forming a coated substrate, the method comprising:
   a) coating a substrate with a washcoat composition comprising zeolite particles; and
   b) coating the substrate with a washcoat composition containing catalytically active particles according to claim 42.

51. The method of claim 50, wherein coating the substrate with the washcoat layer comprising zeolite particles is performed before coating the substrate with the washcoat layer comprising catalytically active particles.

52. The method of claim 50, wherein coating the substrate with the washcoat layer comprising catalytically active particles is performed before coating the substrate with the washcoat layer comprising zeolite particles.

53. The method of claim 50, further comprising coating the substrate with a corner-fill washcoat prior to both step a) and step b).

54. The method of claim 50, wherein the washcoat composition comprising zeolite particles comprises a thickness of 25 g/l to 90 g/l.

55. The method of claim 50, wherein the washcoat composition comprising catalytically active particles comprises a thickness of 50 g/l to 250 g/l.

56. A coated substrate comprising a washcoat according to claim 42.

57. A coated substrate comprising a washcoat according to claim 42, further comprising a washcoat layer comprising zeolite particles.

58. A catalytic converter comprising a coated substrate according to claim 56.

59. An exhaust treatment system comprising a conduit for exhaust gas and a catalytic converter according to claim 58.

60. A diesel vehicle comprising a catalytic converter according to claim 58.

61. The diesel vehicle of claim 60, wherein the diesel vehicle is a light-duty diesel vehicle.

* * * * *